(12) United States Patent
O'Keeffe

(10) Patent No.: US 7,621,073 B2
(45) Date of Patent: Nov. 24, 2009

(54) RODLOK TACKLE BOX

(76) Inventor: Michael O'Keeffe, P.O. Box 122, Harcourt, Victoria (AU) 3453

( * ) Notice: Subject to any disclaimer, the term of this patent is extended or adjusted under 35 U.S.C. 154(b) by 723 days.

(21) Appl. No.: 11/013,330

(22) Filed: Dec. 17, 2004

(65) Prior Publication Data

US 2005/0155276 A1 Jul. 21, 2005

Related U.S. Application Data

(60) Provisional application No. 60/532,946, filed on Dec. 30, 2003.

(51) Int. Cl.
*A01K 97/06* (2006.01)
*A01K 97/00* (2006.01)
(52) U.S. Cl. .......................... 43/54.1; 43/25.2
(58) Field of Classification Search .............. 43/21.2, 43/54.1, 57.1, 25.2; 206/315.11; 224/920; D22/139, 136, 148
See application file for complete search history.

(56) References Cited

U.S. PATENT DOCUMENTS

| | | | |
|---|---|---|---|
| 2,153,549 A | 4/1939 | Cooper | |
| 2,596,403 A * | 5/1952 | Hoffman | 43/21.2 |
| 3,889,860 A | 6/1975 | Lindsay | |
| 4,014,128 A | 3/1977 | Hrdlicka | |
| 4,353,182 A | 10/1982 | Junkas et al. | |
| 4,529,112 A * | 7/1985 | Miller | 224/610 |
| 5,347,746 A | 9/1994 | Letson | |
| 5,502,916 A * | 4/1996 | Krewson, Jr. | 43/25.2 |
| 5,515,640 A * | 5/1996 | Cosby et al. | 43/25.2 |
| 5,636,469 A * | 6/1997 | Pizzolo et al. | 43/54.1 |
| 6,085,455 A * | 7/2000 | Bracken et al. | 43/25.2 |
| D460,859 S | 7/2002 | Tipton | |
| 6,487,814 B1 | 12/2002 | Arredondo et al. | |
| 6,584,723 B2 | 7/2003 | Elmore | |
| 6,626,409 B1 * | 9/2003 | Thompson | 248/539 |
| 2002/0166281 A1 * | 11/2002 | Broberg | 43/21.2 |

* cited by examiner

*Primary Examiner*—Kurt Rowan
(74) *Attorney, Agent, or Firm*—Robert Platt Bell

(57) ABSTRACT

The present invention comprises four embodiments of an apparatus, which allows fishing poles or other items to be carried with a standard sized tackle box in combination with one hand. The present invention also allows fishing poles to be stored on the lid (or elsewhere) on a tackle box so that the tackle box and poles form one compact unitary package. The rods are arranged longitudinally with the tackle box, and are attached to the lid of the tackle box, not the handle, such that the handle is left clear. In each embodiment, a tube or tube portion secures the handle end of the pole, while an optional cutout may be provided to secure the reel portion to on side of the box lid. The apparatus may be built into the box lid, or may be provided as an aftermarket or OEM attachment. Optional rod clips may be used to hold the upper portion of the rod if a multi-piece rod is disassembled.

16 Claims, 42 Drawing Sheets

RODLOK TACKLE BOX

CROSS-REFERENCE TO RELATED APPLICATIONS

The present application claims priority from Provisional U.S. Patent Application No. 60/532,946 filed on Dec. 30, 2003, and incorporated herein by reference.

FIELD OF THE INVENTION

The present invention relates to fishing gear and tackle boxes. In particular, the present invention is directed toward an apparatus to enable the carrying of one or more fishing poles attached to a tackle box, enabling the entire assembly of fishing poles and a tackle box to be held in one hand.

BACKGROUND OF THE INVENTION

Fishing tackle boxes are known in the art. Probably the most famous manufacturer of these boxes is the PLANO MOULDING COMPANY of Plano Illinois (www.planomolding.com). PLANO has made various plastic fishing tackle and other types of utility boxes for a number of years and is known throughout the industry for quality and innovative fishing gear.

However, none of these fishing boxes provides a means of carrying the tackle box and a fishing pole or poles with one hand, or a means of attaching fishing poles to a tackle box such that the entire assembly forms one package for handling and storage. Most users end up putting their hand around the rod and the box handle, which can be uncomfortable, and also result in dropping one or both items. When setting down or picking up such a combination, care must be used to prevent dropping the rod and usually two hands are required. With the ever-increasing cost of high technology fishing poles (e.g., carbon fiber and the like) a better and more secure method of carrying fishing gear is needed.

Fishermen, being very resourceful have come up with a number of fishing accessories designed to make the fishing experience more enjoyable. Various fishing pole holders have been designed over the years. An example of one such rod holder is disclosed, for example, in Elmore, U.S. Pat. No. 6,584,723, issued Jul. 1, 2003, incorporated herein by reference. The Elmore apparatus will hold a fishing pole on a railing or boat, for example, while fishing.

Various other rod holders attached to fishing boxes are also shown in the Prior Art. However, it appears that most if not all of these Prior Art holders are designed to use a tackle box or the like as a base for holding a fishing pole while fishing. An example of two such Patents are Tipton, U.S. Pat. No. D460,859, issued Jul. 30, 2002, and Hrdlicka, U.S. Pat. No. 4,014,128, issued Mar. 29, 1977, both of which are incorporated herein by reference.

Various fishing carts, stands, and storage devices, which hold rods, are also shown in the Prior Art. An example of such a device is Arrendondo et al., U.S. Pat. No. 6,487,814, issued Dec. 3, 2002 and incorporated herein by reference. The Arrendondo device is quite bulky and even though provided with a carrying handle, would not be easy to carry with one hand, particularly when fully loaded.

Lindsey, U.S. Pat. No. 3,889,860, issued Jun. 17, 1975 and incorporated herein by reference, discloses a fishing gear carrier made of a metal bar (actually an extendable gaffing pole, it appears) with accessory wire racks. A fisherman then attaches various gear such as a tackle box, fishing poles, bait bucket and the like to this apparatus. While this may help carry multiple items, it requires that the fisherman acquire yet another piece of fishing related apparatus. Moreover, the fisherman must carefully attach the apparatus to the various gear being carried, and it does not appear than all items will remain attached if the combination is set down on the ground. In addition, it appears that the fishing poles would touch the ground if the apparatus were set down.

Junkas et al., U.S. Pat. No. 4,353,182, issued Oct. 12, 1982 and incorporated herein by reference, discloses a fishing box, which is provided with a pole holder on the handle. This apparatus appears to allow for one-handed operation. However, as the poles are attached to the handle, if the device is set down, the weight of the poles will move the handle to one side, possibly damaging the poles. If the user wants to open the box, the poles must be removed from the handle and the handle swung out of the way. In addition, this apparatus appears to be limited to a large fishing box which doubles as a seat, and thus is fairly bulky, large, and could be difficult to carry.

Letson, U.S. Pat. No. 5,347,746, issued Sep. 20, 1994, and incorporated herein by reference, discloses a fishing tackle box with accessory holders, including fishing pole holders attached to the top surface of the box. The rod holders appear to grip the rod in the middle (no drawing of the apparatus in use is provided) and thus allow the handle end with reel to hang over. The rod clips do not appear to be very robust.

Pizzolo et al., U.S. Pat. No. 5,636,469, issued Jun. 10, 1997 and incorporated herein by reference, discloses a fishing tackle box in which hook-and-loop fasteners are used to hold a fishing pole to the side of the box. While this appears to be a bit more secure than the apparatus of Letson, it does require some effort to secure and release the rods. Moreover, the hook and loop fastener system will wear out over time with repeated use.

Cooper, U.S. Pat. No. 2,153,549, issued Apr. 11, 1939, and incorporated herein by reference, discloses a combination bait and tackle box. Cooper discloses tying a rod holder case to the side of his box. This apparatus is also time consuming to secure and release the rods.

What remains a requirement in the art is an apparatus which will allow a user to carry a standard sized tackle box and one or more fishing poles in one hand, while allowing the rods to be readily inserted and removed from the combination, while providing support for the rods when the tackle box is set down. It also remains a requirement in the art to provide a tackle box, which may store fishing poles such that a single package of tackle box and fishing poles is created.

SUMMARY OF THE INVENTION

The present invention comprises four embodiments of an apparatus, which allows fishing poles or other items to be carried with a standard sized (or other size) tackle box in combination with one hand. In addition, the present invention allows fishing poles to be stored on the lid (or elsewhere) on a tackle box such that the combination of tackle box and fishing poles forms one compact, unitary and convenient package. The rods are arranged longitudinally with the tackle box, and are attached to the lid of the tackle box, not the handle, such that the handle is left clear.

In each embodiment, a tube or tube portion secures the handle end of the pole, while an optional cutout may be provided to secure the reel portion to on side of the box lid. The apparatus may be built into the box lid, or may be provided as an aftermarket or OEM attachment. Optional rod clips may be used to hold the upper portion of the rod if a multi-piece rod is disassembled.

In one embodiment, tube-like structures are mounted internally, with holes in the end of the tackle box. Another embodiment shows the tube like structures to be mounted separately, with the option of attaching to an existing tackle box.

Another aspect of the design is to have a slot cut into the tubes to allow the attaching shaft of the fishing reel to slide into the tube with the rod. Some shapes can then be cut into the tube, off the slots, to allow the reel shaft to be twisted slightly, therefore being locked into the tube, thus preventing the rod & reel from sliding out.

All four embodiments may have the tube like structures mounted or attached to the tackle box lid, but they may also be mounted or attached to any part of the tackle box. The tube like structure may even be incorporated as the tackle box handle.

Other methods of securing the fishing poles in a similar fashion may include cutting most of the tube away, using different holes or slots or any other method without departing from the spirit and scope of the present invention.

It is also desired to have some way to support the fishing pole ends (tips) if necessary. Some small "V" hooks have been attached to the tackle box lid sides for this purpose, as illustrated in the first embodiment of the present invention.

It is also envisaged that the embodiments described herein may be used in conjunction with applications such as buckets, stools, and-the like, or be a free standing unit in its own right.

It is also envisaged that a flashlight or the like may be slid into the tubes and be held securely, so that a flashlight can be securely carried and even illuminate the user's path when walking at night and carrying the tackle box.

While described herein in the context of fishing gear, the apparatus of the present invention may also be applied to other arts, where it is desired to carry different types of gear along with a supply box.

DETAILED DESCRIPTION OF THE INVENTION

Figure 1:
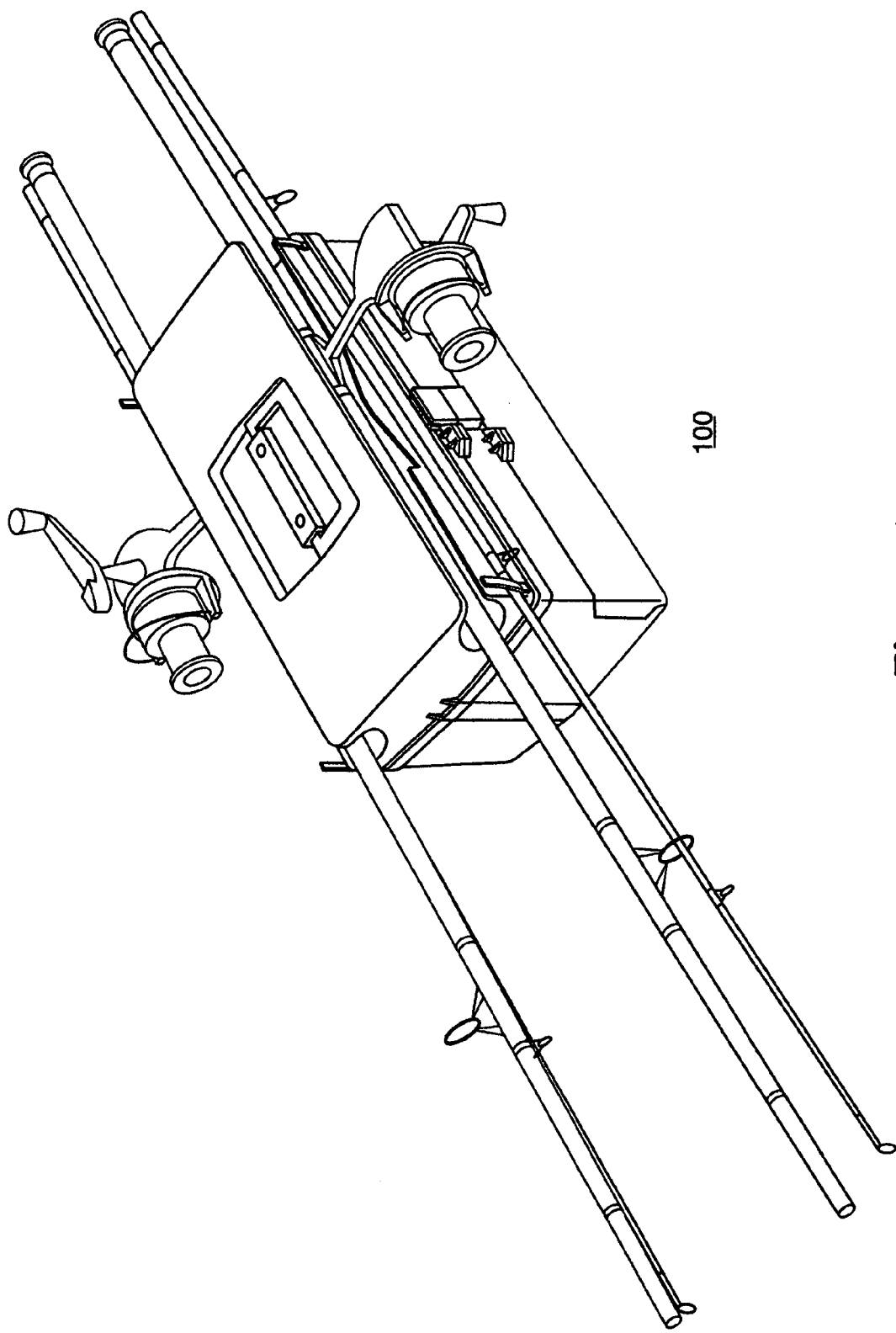
FIG. 1 illustrates a perspective view of the first embodiment of the present invention.
Figure 2:
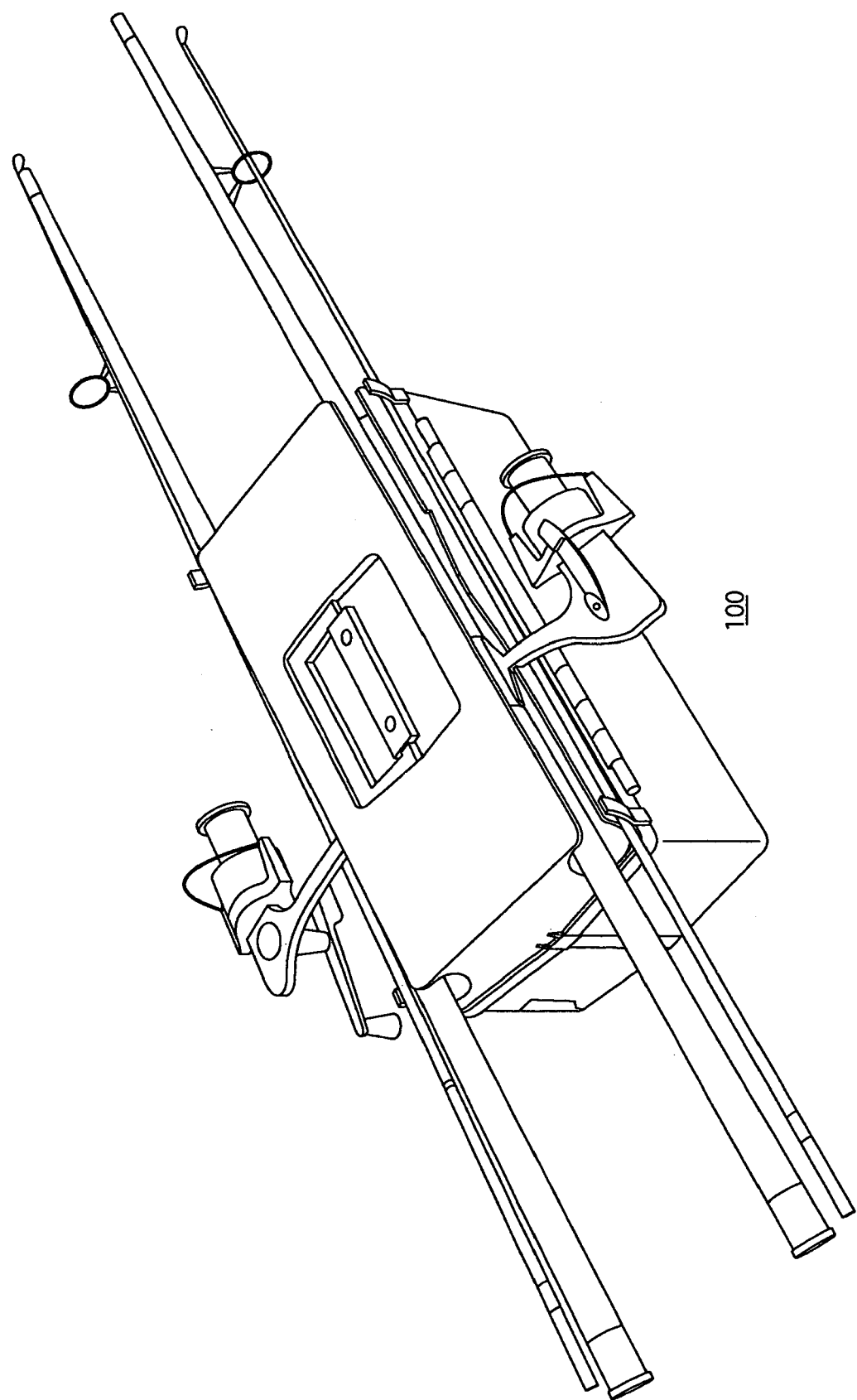
FIG. 2 illustrates a perspective view of the first embodiment of the present invention from the opposite side of FIG. 1.
Figure 3:
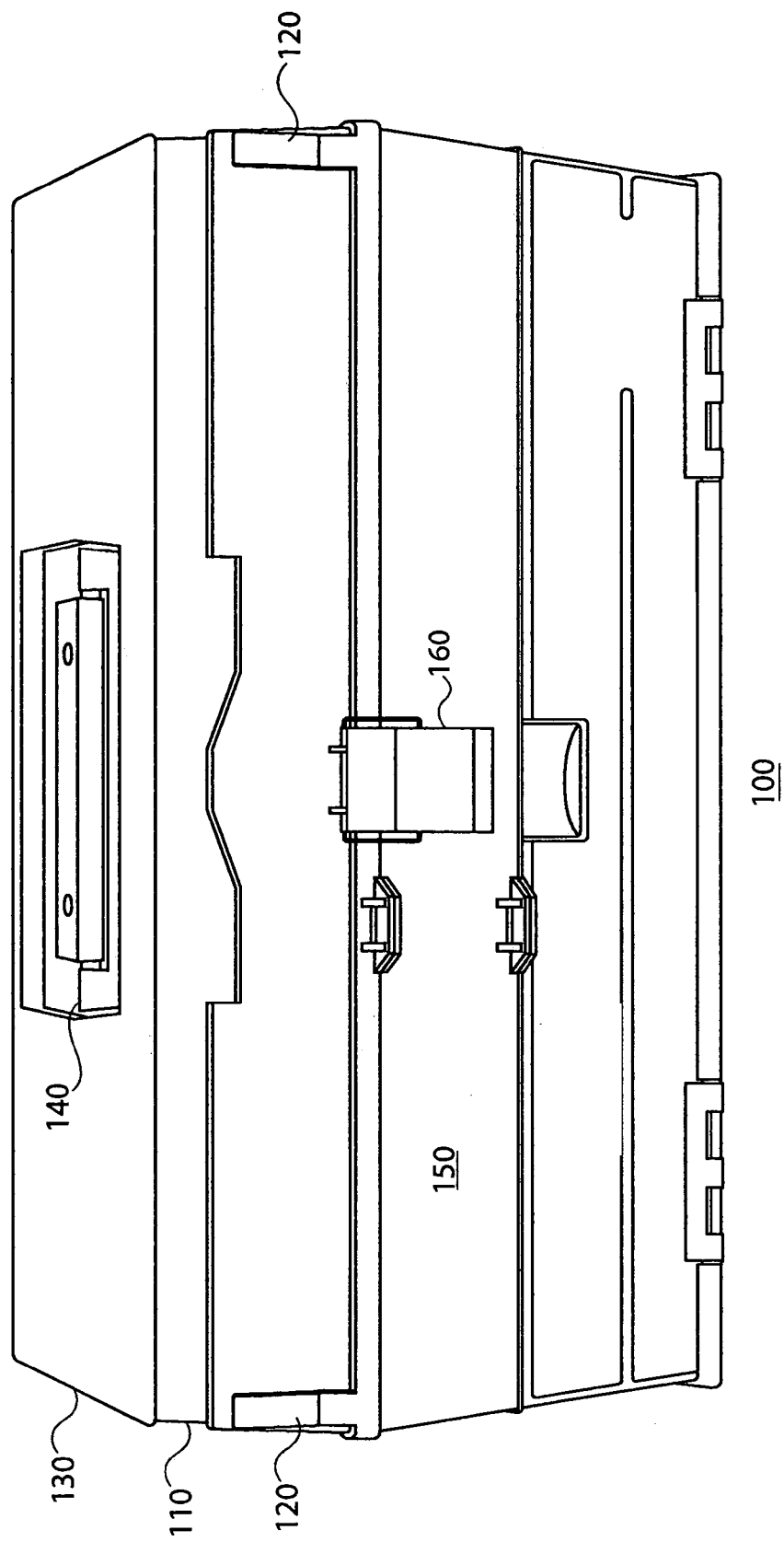
FIG. 3 illustrates a front view of the first embodiment of the present invention.
Figure 4:
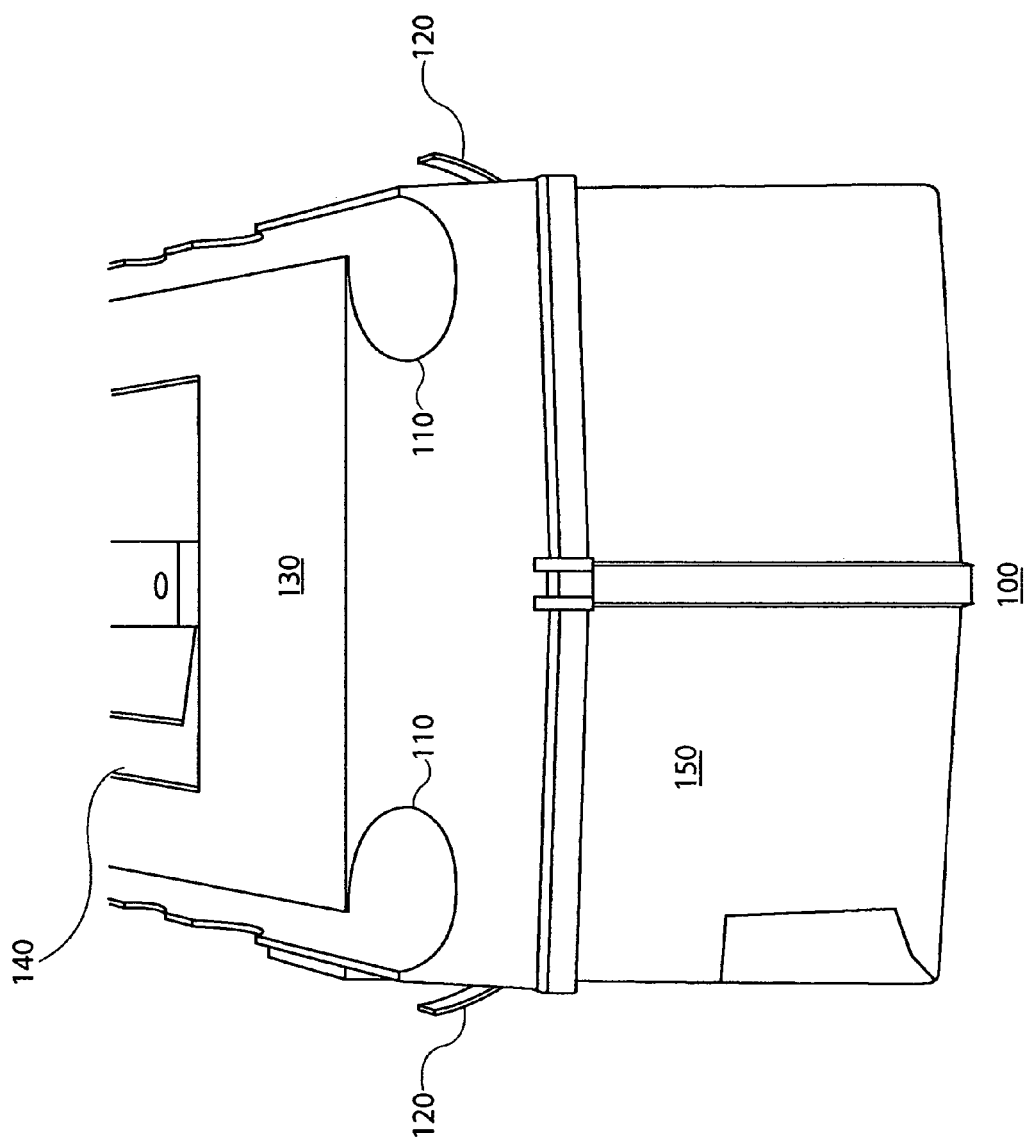
FIG. 4 illustrates a side view of the first embodiment of the present invention.
Figure 5:
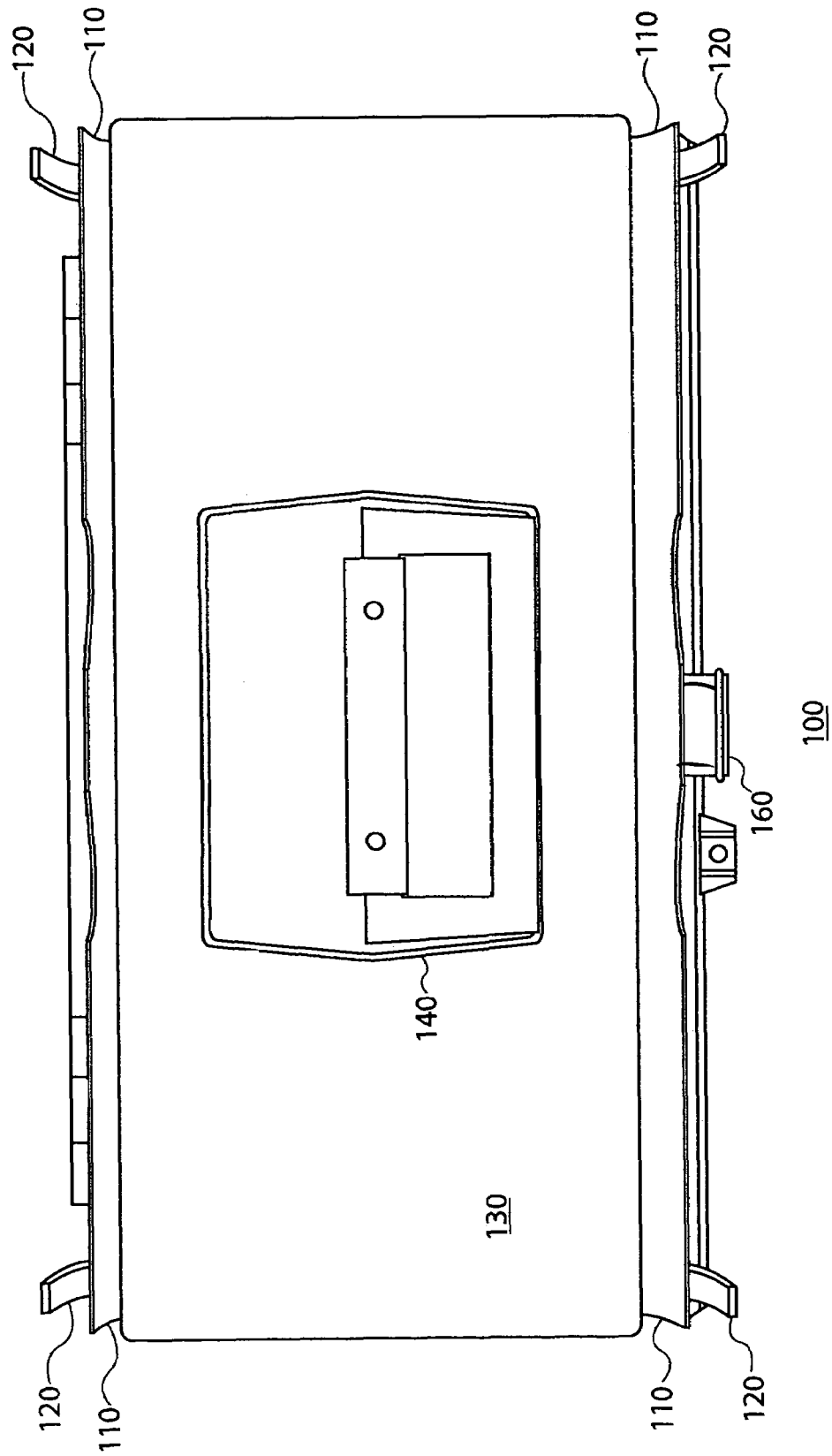
FIG. 5 illustrates a top view of the first embodiment of the present invention.
Figure 10:
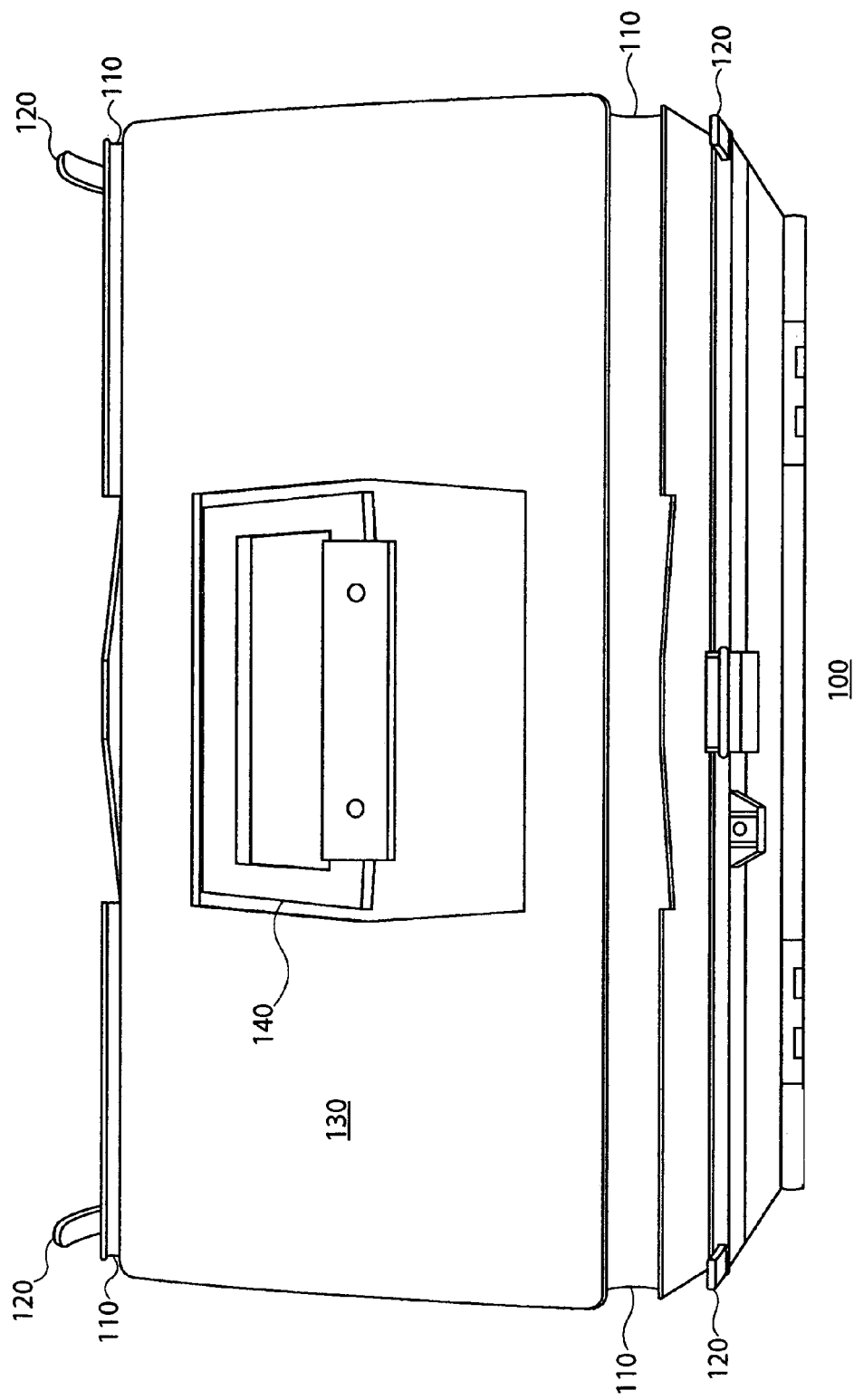
FIG. 10 illustrates a top view of the first embodiment of the present invention.
Figure 11:
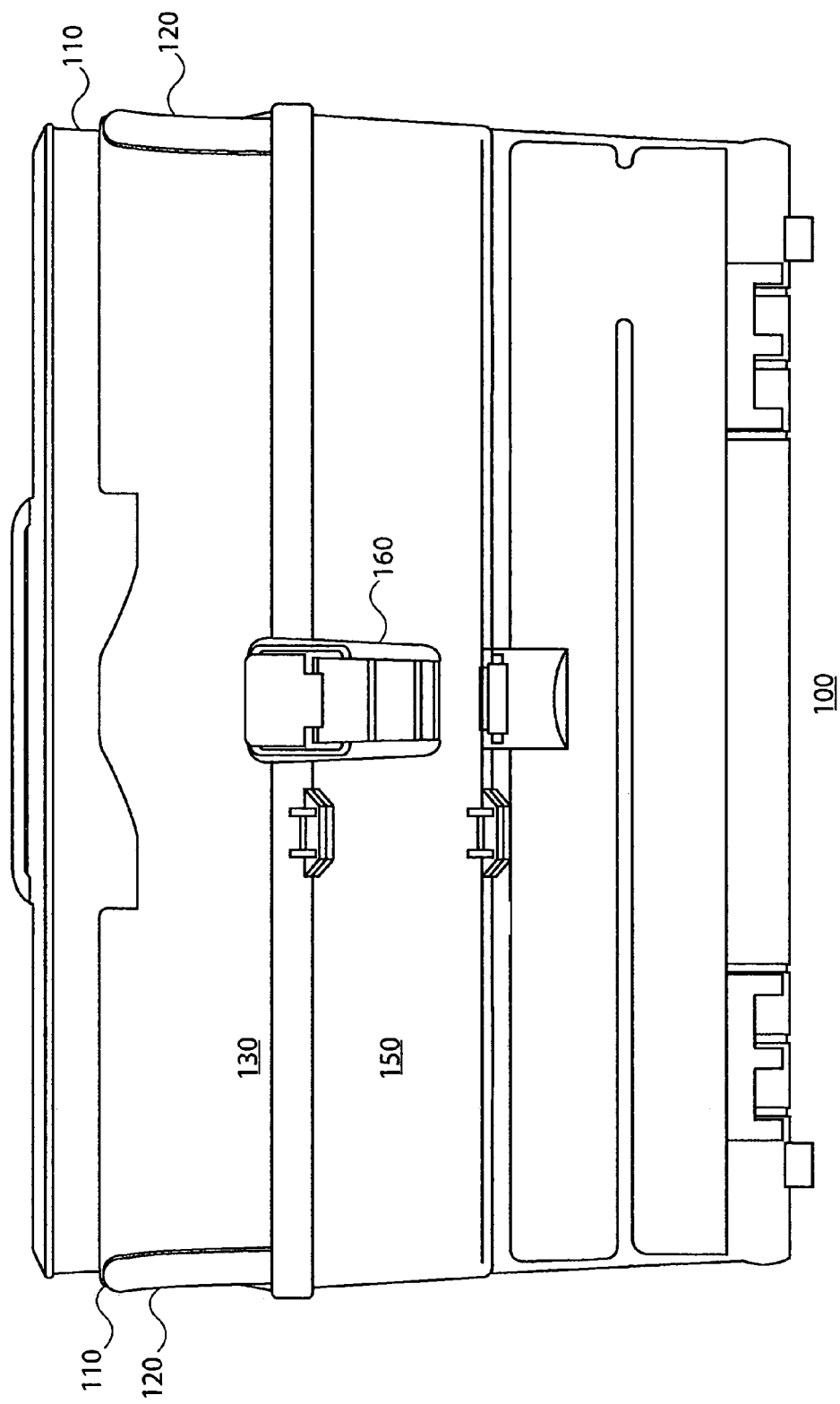
FIG. 11 illustrates a front view of the first embodiment of the present invention.
Figure 12:
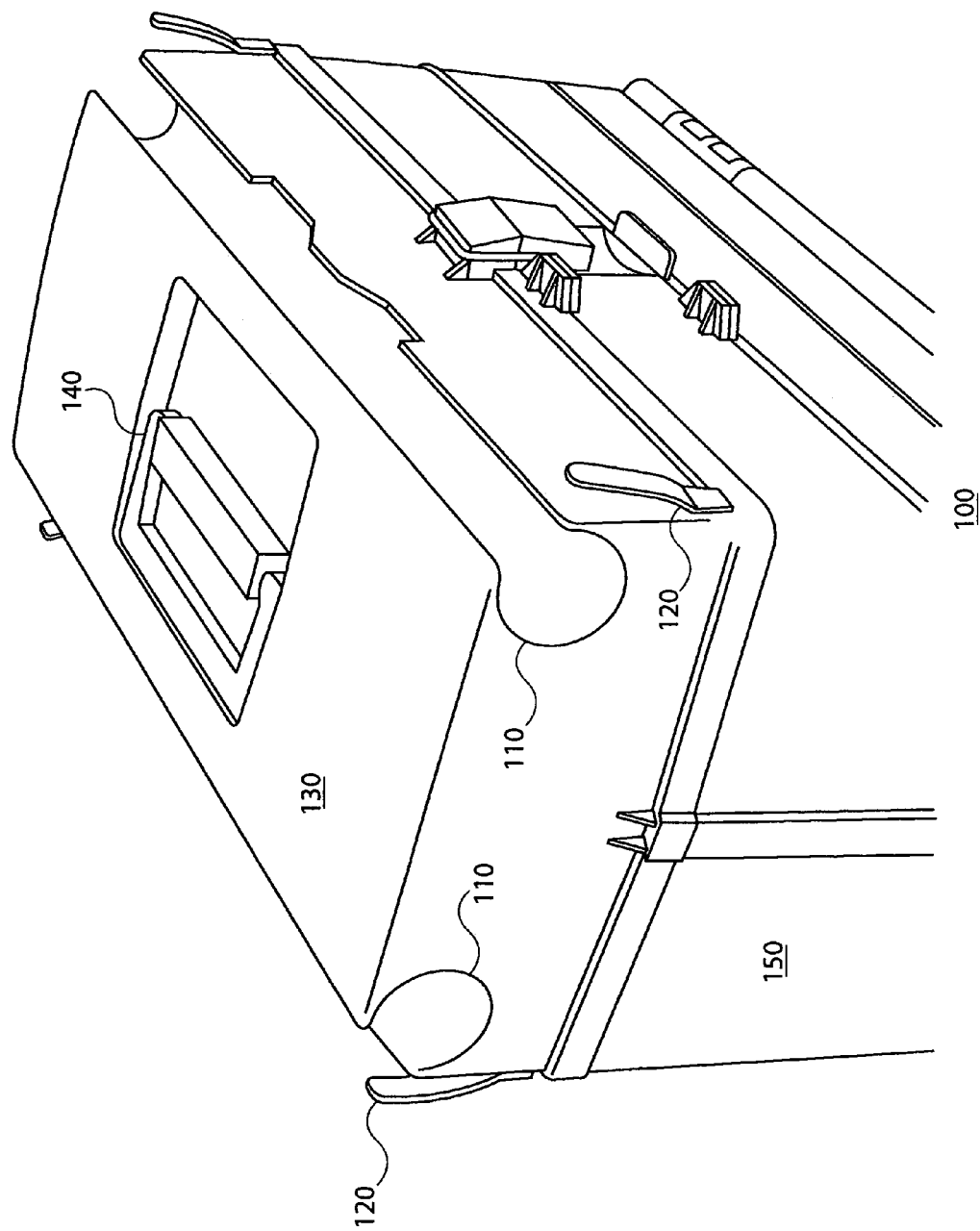
FIG. 12 illustrates a perspective view of the first embodiment of the present invention.
Figure 13:
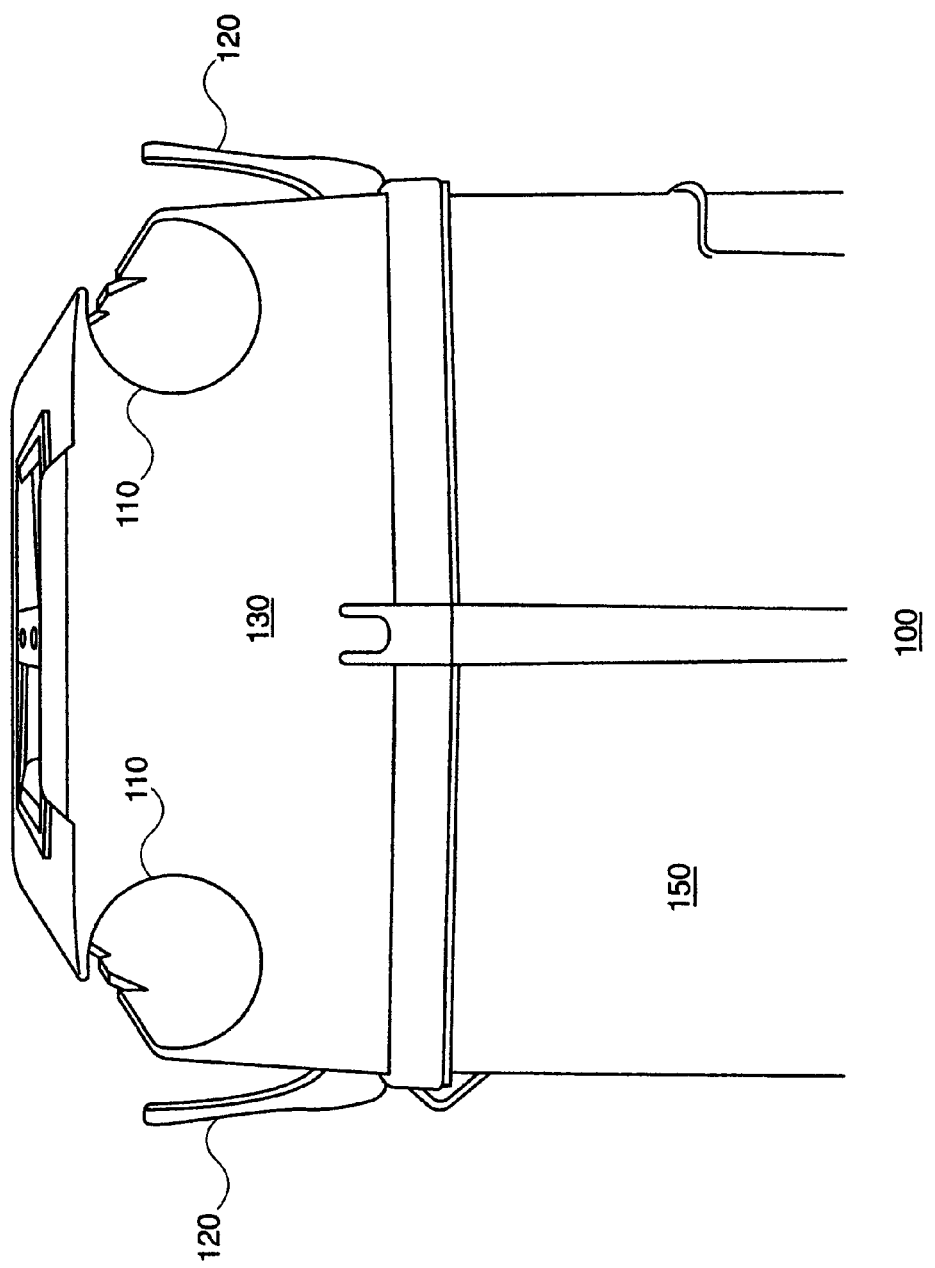
FIG. 13 illustrates a side view of the first embodiment of the present invention.
Figure 14:
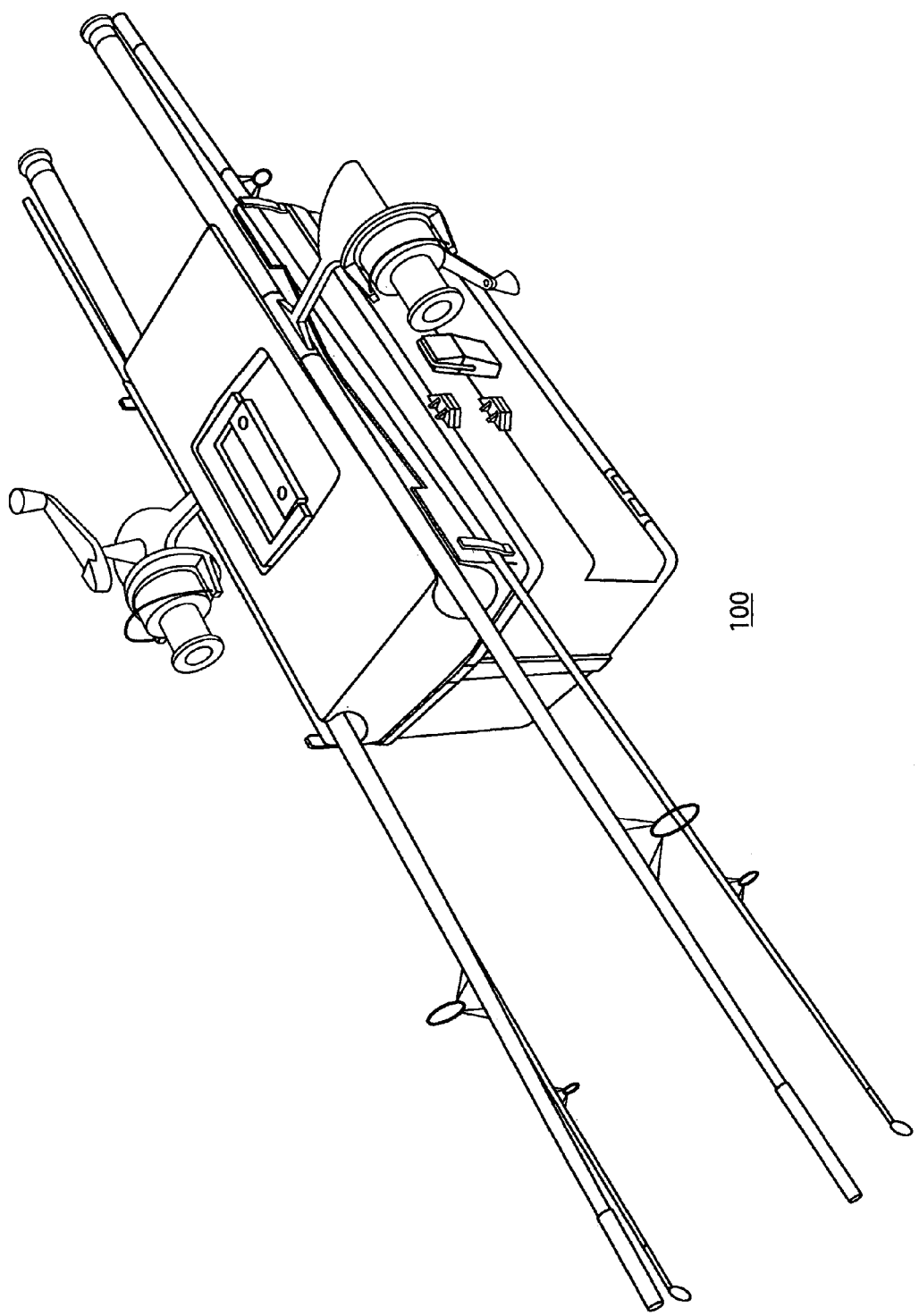
FIG. 14 illustrates a perspective view of the first embodiment of the present invention, illustrating fishing poles inserted into the device.
Figure 19:
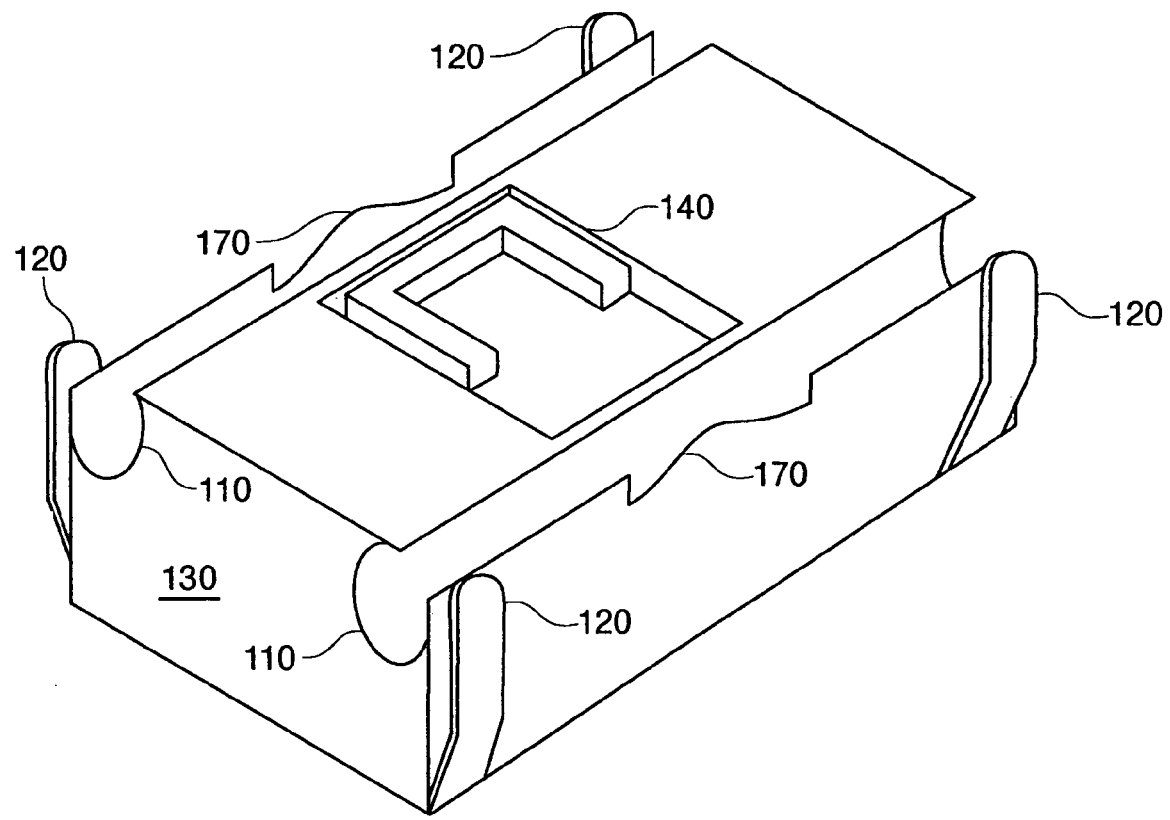
FIG. 19 is a drawing illustrating a perspective view of the lid of first embodiment of the present invention.
Figure 20:
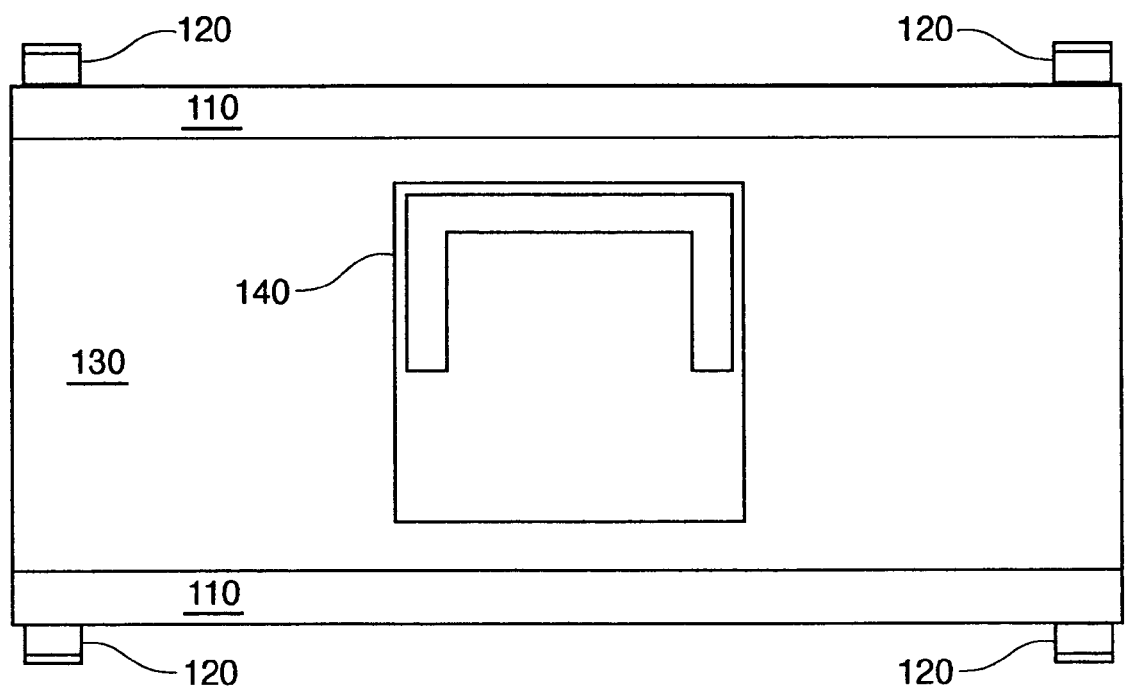
FIG. 20 is a drawing illustrating a top view of the first embodiment of the present invention.
Figure 21:
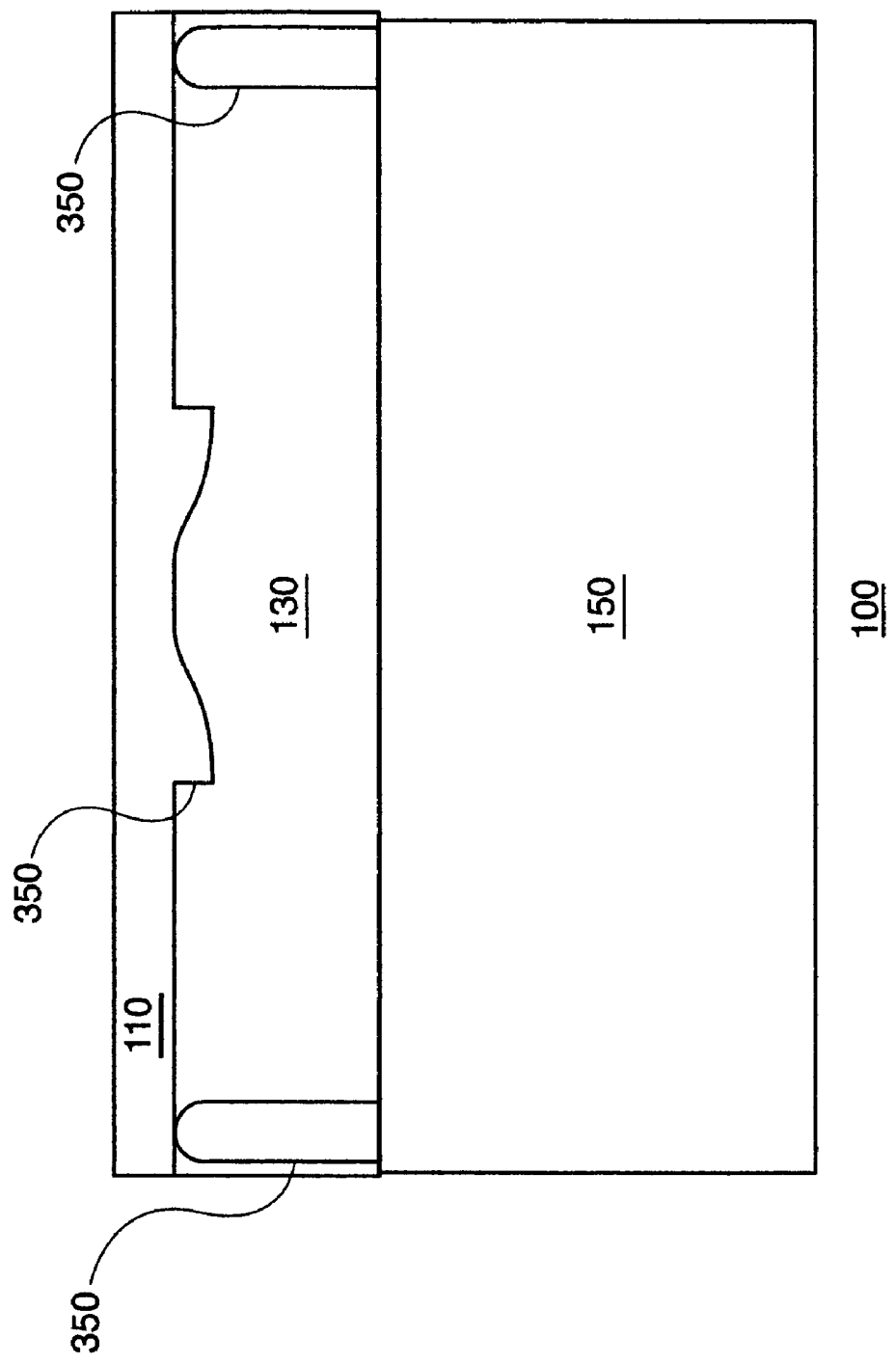
FIG. 21 is a drawing illustrating a front view of the first embodiment of the present invention.
Figure 22:
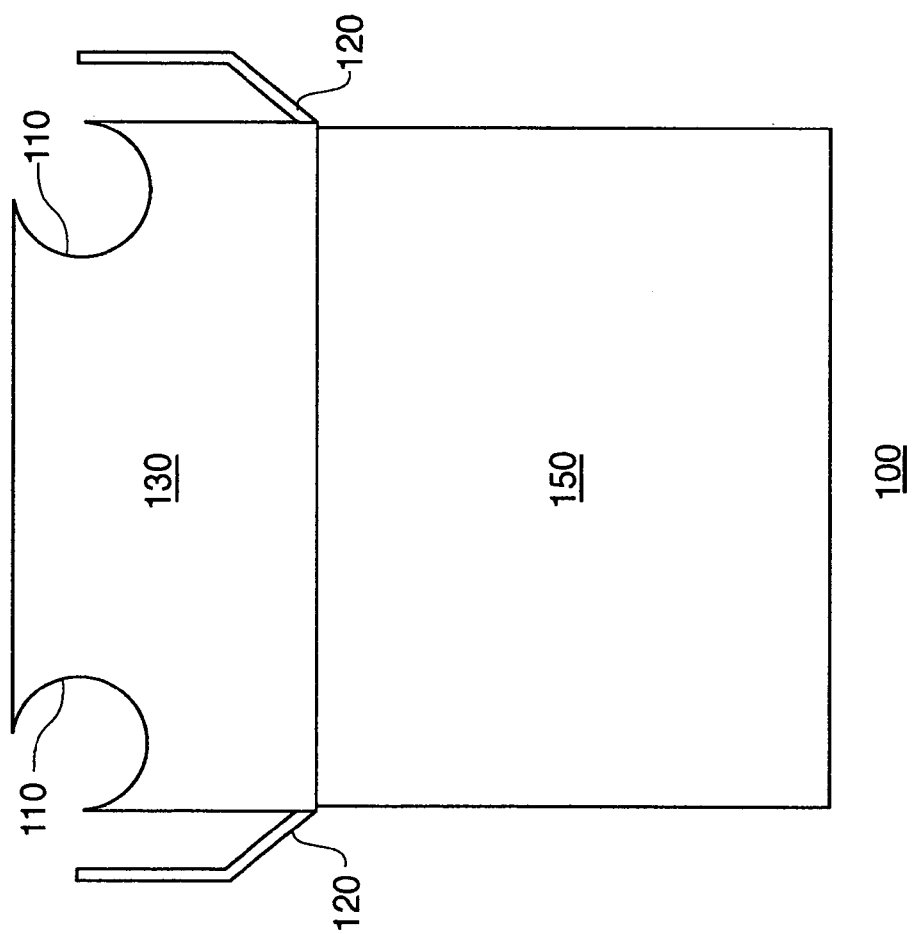
FIG. 22 is a drawing illustrating a side view of the first embodiment of the present invention.

FIG. 1 illustrates a perspective view of the first embodiment of the present invention. FIG. 2 illustrates a perspective view of the first embodiment of the present invention from the opposite side of FIG. 1. FIG. 3 illustrates a front view of the first embodiment of the present invention. FIG. 4 illustrates a side view of the first embodiment of the present invention. FIG. 5 illustrates a top view of the first embodiment of the present invention. FIG. 10 illustrates a top view of the first embodiment of the present invention. FIG. 11 illustrates a front view of the first embodiment of the present invention. FIG. 12 illustrates a perspective view of the first embodiment of the present invention. FIG. 13 illustrates a side view of the first embodiment of the present invention. FIG. 14 illustrates a perspective view of the first embodiment of the present invention, illustrating fishing poles inserted into the device. FIG. 19 is a drawing illustrating a perspective view of the lid of first embodiment of the present invention. FIG. 20 is a drawing illustrating a top view of the first embodiment of the present invention. FIG. 21 is a drawing illustrating a front view of the first embodiment of the present invention. FIG. 22 is a drawing illustrating a side view of the first embodiment of the present invention.

Referring to FIGS. 1-5, 10-14, and 19-22, the first embodiment of the present invention will now be described. In this first embodiment, a tackle box 100 may be provided with a box portion 150 and a lid portion 130 which may be hinged or the like as is known in the art. A clasp 160 or other fastening means may hold lid portion 130 to box portion 150. A centrally located handle 140 may be used to carry the box 100.

Molded into lid 130 may be one or more tubular portions 110 which in this embodiment may comprise open tubular portions having a semicircular cross-section. Cutouts 170 may be provided in these tubular portions 110 to allow the reel support to rest when a fishing pole is placed in tubular portion 110 as is illustrated in FIGS. 1, 2 and 14.

In addition, the embodiment of FIG. 1 may also be provided with rod clips 120 to hold a rod portion, for example, in an instance where a multi-piece rod is used. As illustrated in FIGS. 1, 2, and 14, this second rod portion may be attached to rod clips 120 so that the entire rod and tackle box assembly forms a compact package. Additional rod clips may be provided for rods comprising additional sections (e.g., 3 or more). Moreover, although illustrated only in connection with the first embodiment of the present invention, it should be understood that the rod clips 120 of this first embodiment may be provided in all four embodiments of the present invention as disclosed herein.

Figure 6:
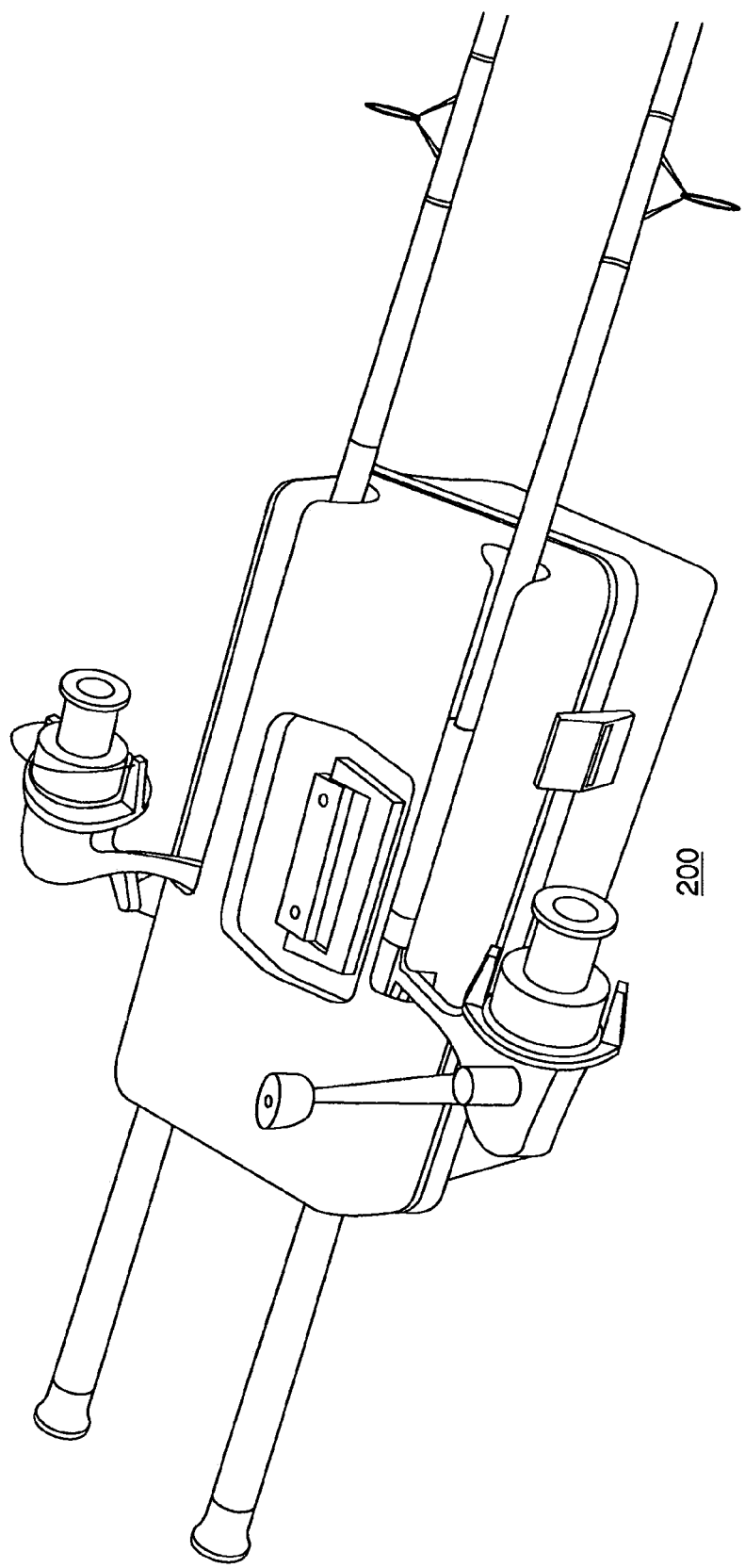
FIG. 6 illustrates a perspective view of the second embodiment of the present invention.
Figure 9:
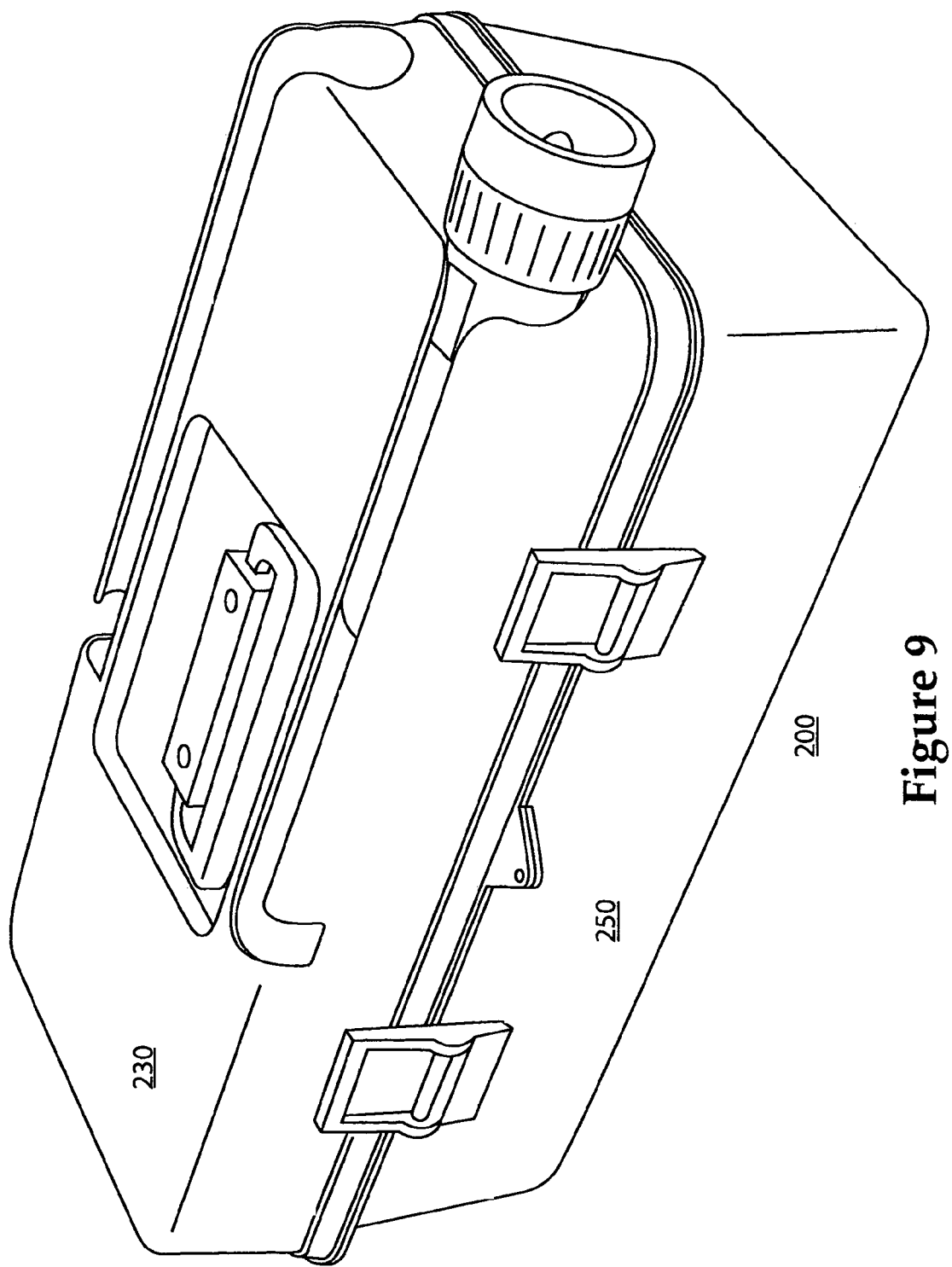
FIG. 9 illustrates a perspective view of the second embodiment of the present invention illustrating a flashlight inserted into the apparatus.
Figure 15:
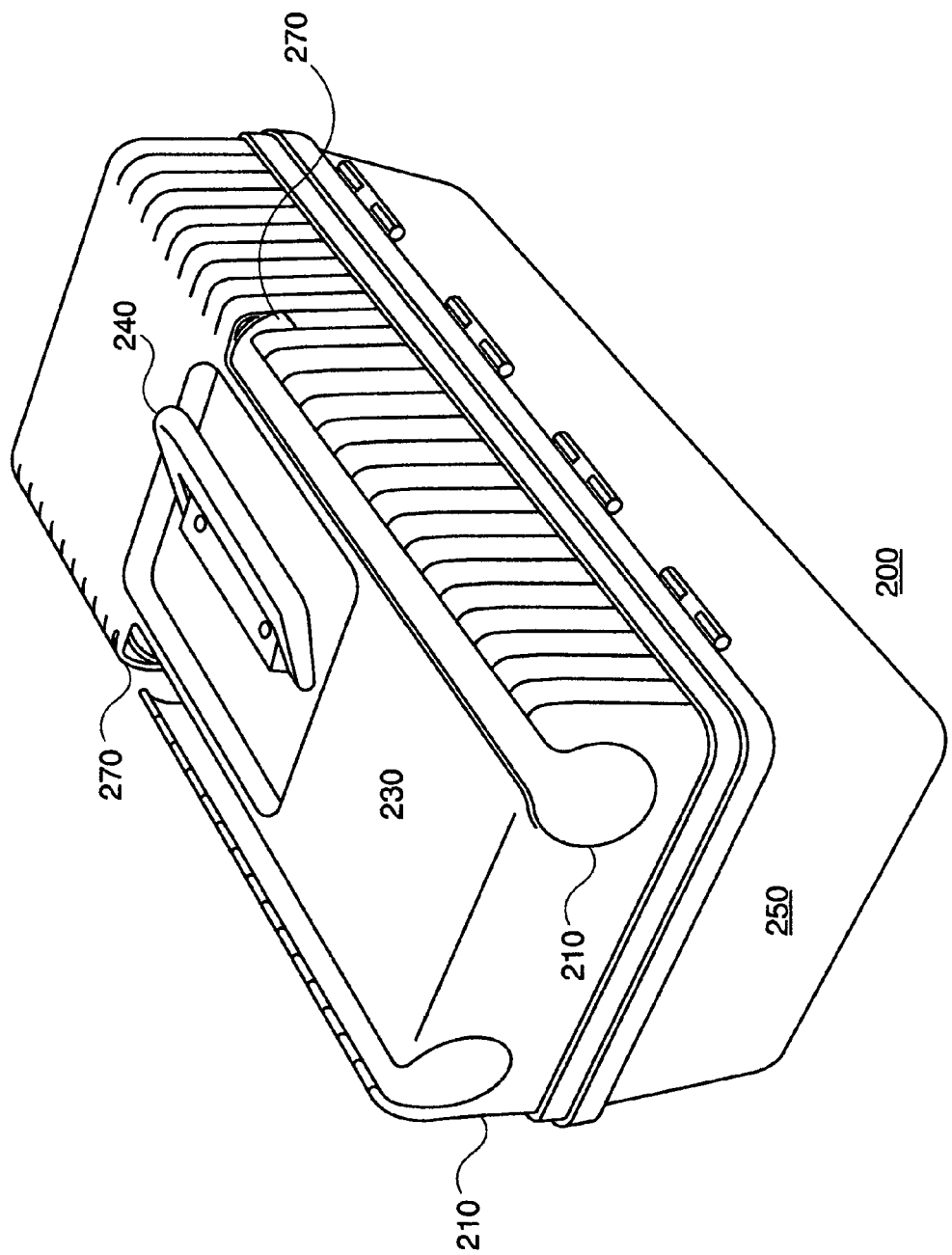
FIG. 15 illustrates a perspective view of the second embodiment of the present invention.
Figure 16:
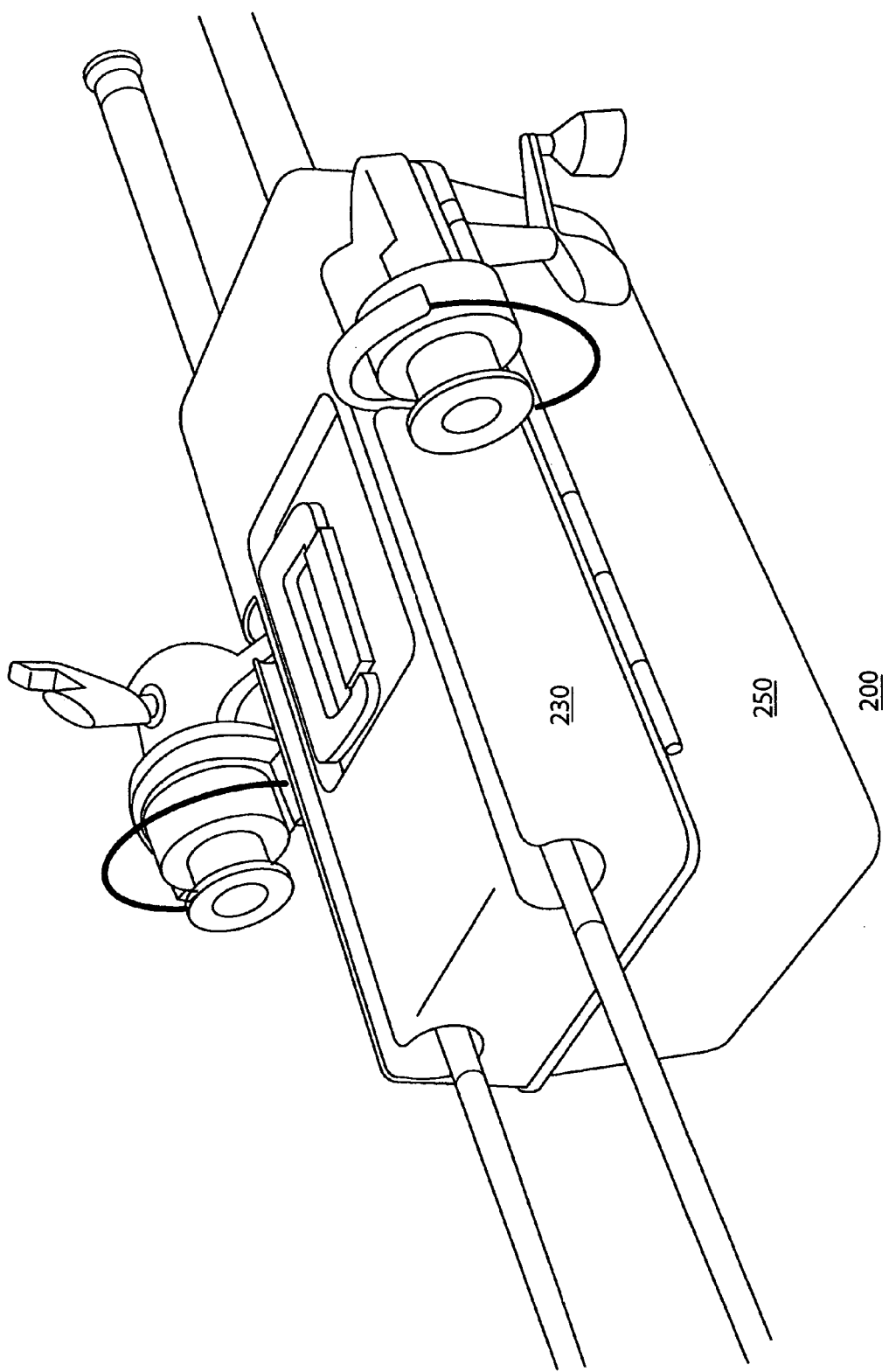
FIG. 16 illustrates a perspective view of the second embodiment of the present invention, with fishing poles inserted into the device.
Figure 23:
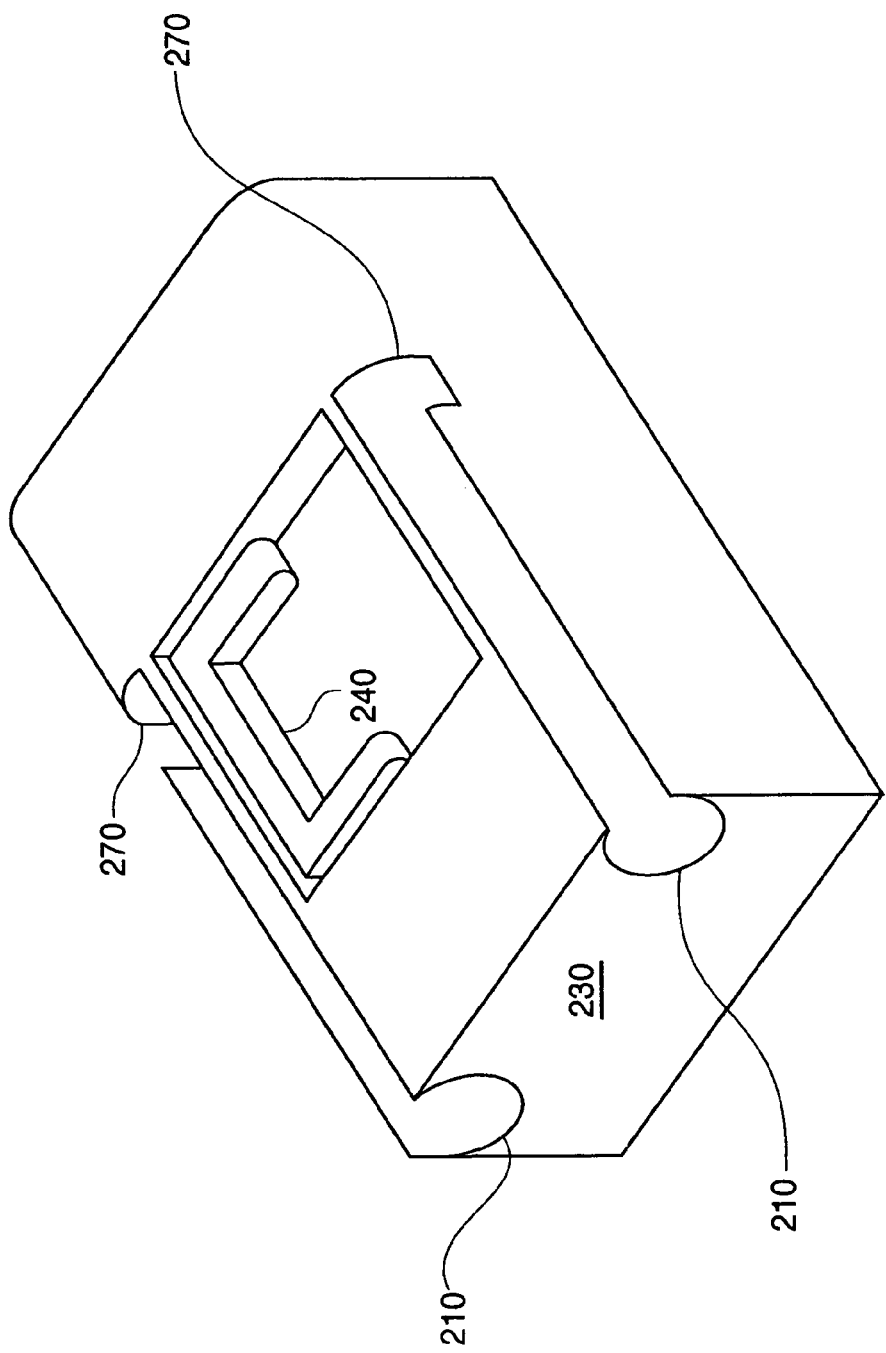
FIG. 23 is a drawing illustrating a perspective view of the second embodiment of the present invention.
Figure 24:
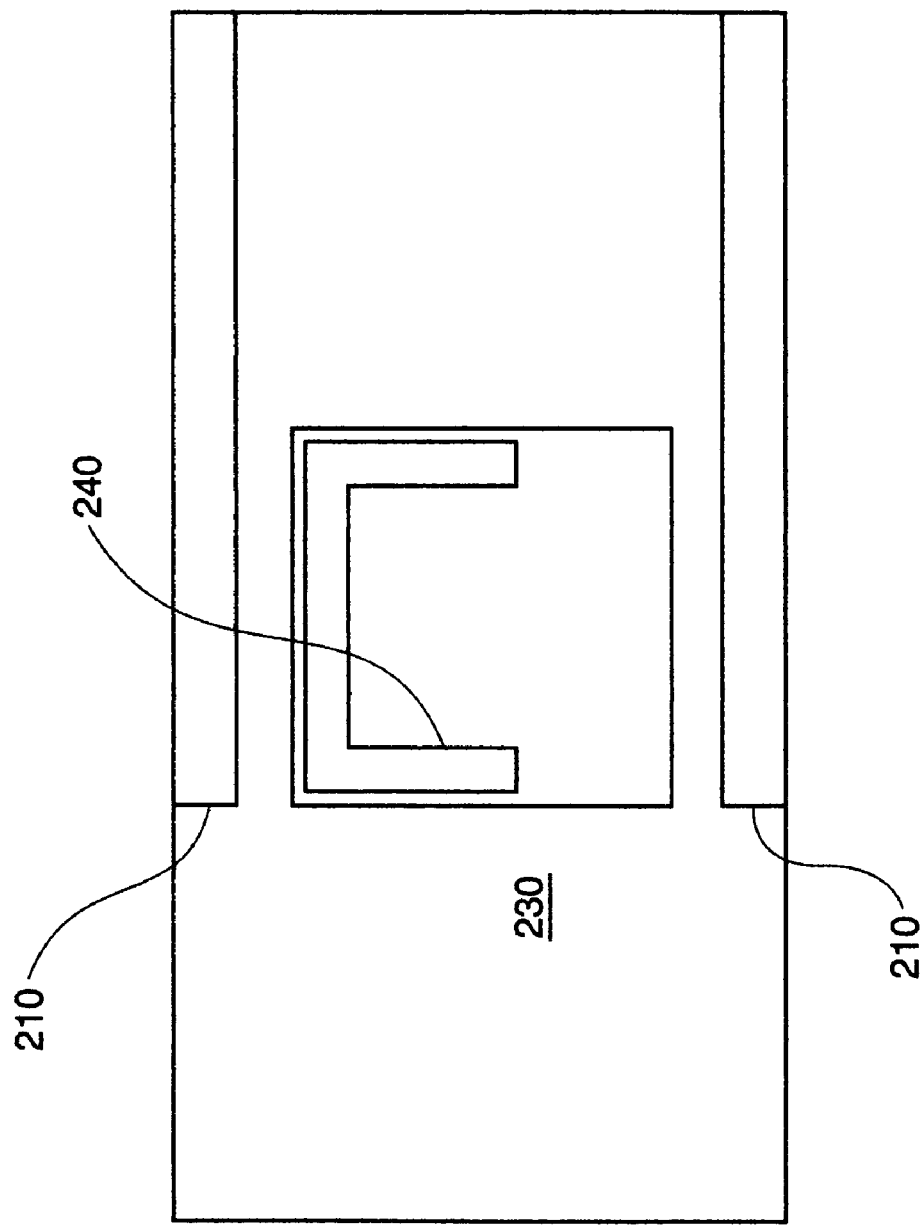
FIG. 24 is a drawing illustrating a top view of the second embodiment of the present invention.
Figure 25:
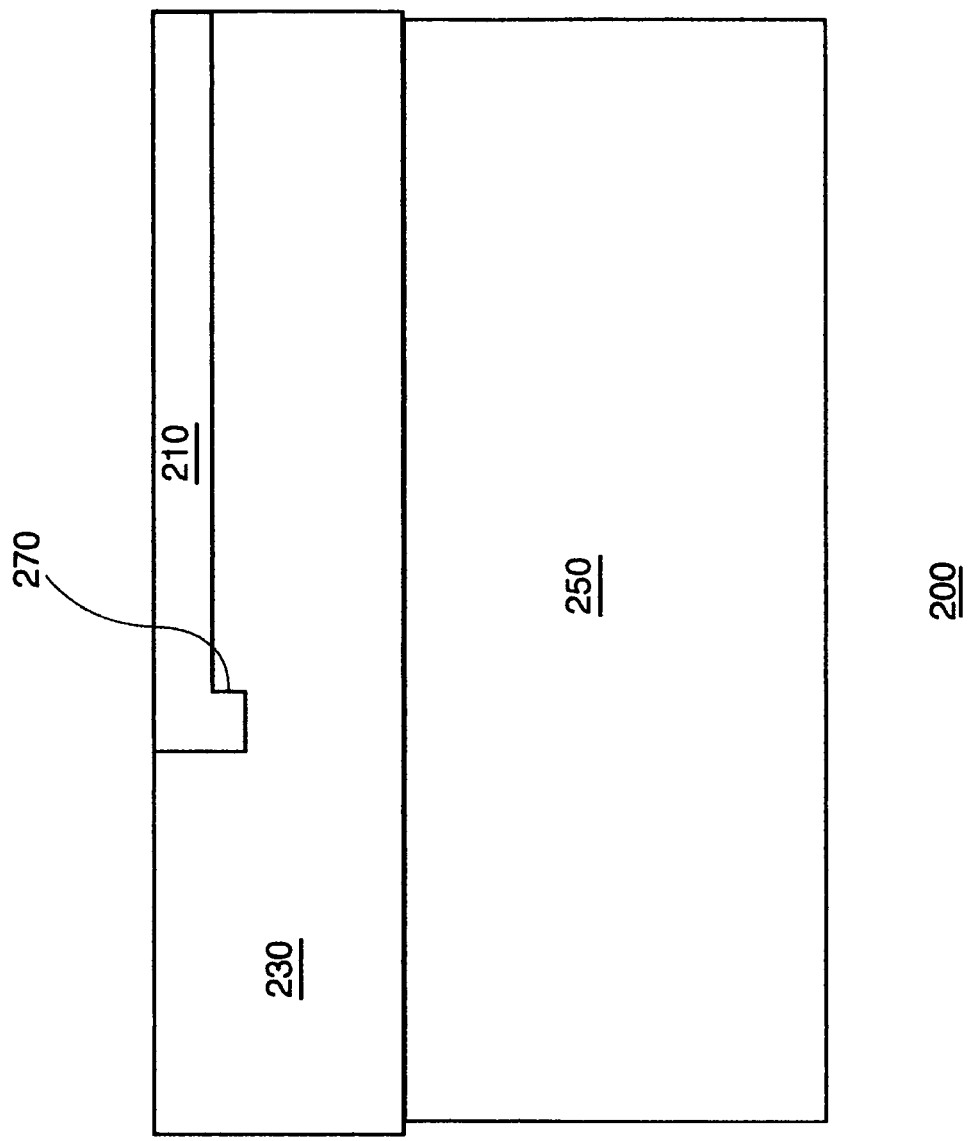
FIG. 25 is a drawing illustrating a front view of the second embodiment of the present invention.
Figure 26:
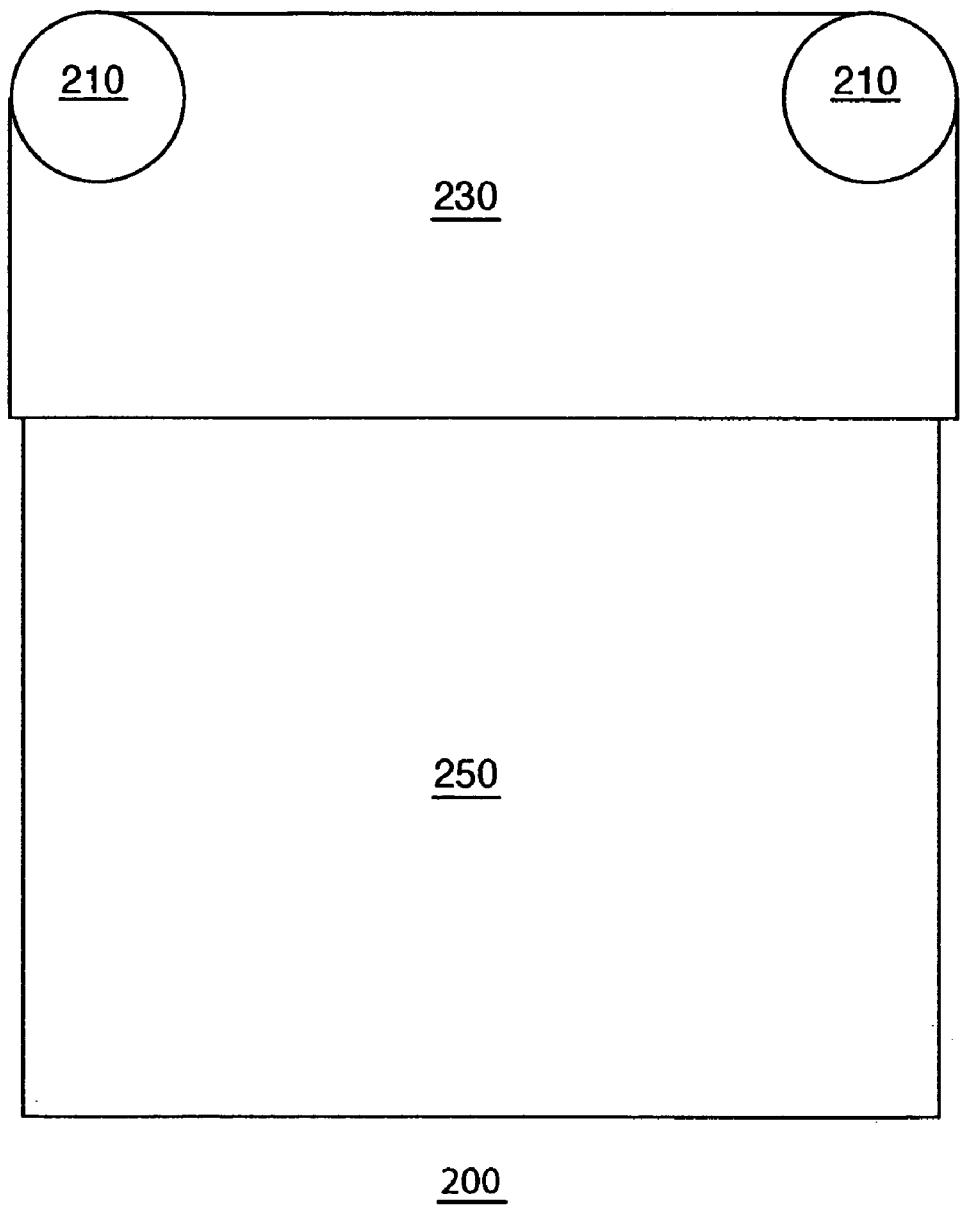
FIG. 26 is a drawing illustrating a side view of the second embodiment of the present invention.

FIG. 6 illustrates a perspective view of the second embodiment of the present invention. FIG. 9 illustrates a perspective view of the second embodiment of the present invention illustrating a flashlight inserted into the apparatus. FIG. 15 illustrates a perspective view of the second embodiment of the present invention. FIG. 16 illustrates a perspective view of the second embodiment of the present invention, with fishing poles inserted into the device. FIG. 23 is a drawing illustrating a perspective view of the second embodiment of the present invention. FIG. 24 is a drawing illustrating a top view of the second embodiment of the present invention. FIG. 25 is a drawing illustrating a front view of the second embodiment of the present invention. FIG. 26 is a drawing illustrating a side view of the second embodiment of the present invention.

Referring to FIGS. 6, 9, 15-16, and 23-26, the second embodiment of the present invention will now be described. In this second embodiment, a tackle box 200 may be provided with a box portion 250 and a lid portion 230 which may be hinged or the like as is known in the art. A clasp or other fastening means (not shown) may hold lid portion 230 to box portion 250. A centrally located handle 240 may be used to carry the box 200.

Molded into lid 230 may be one or more tubular portions 210, which in this embodiment may comprise closed and partially open tubular portions having a circular and semicircular cross-section. Cutouts 270 may be provided in these tubular portions 210 to allow the reel support to rest when a fishing pole is placed in tubular portion 210 as is illustrated in FIGS. 6, and 16.

In this embodiment, the handle portion of the rod may be inserted into the tube 210 and the rod support locked into slot 270. This embodiment provides a much more secure grip for the rod than the first embodiment. As illustrated in FIG. 9, other items such as a flashlight may be inserted into the tubular portion 210. This second embodiment allows for fishing poles and the like to be attached to a tackle box while still preserving the same form factor for the tackle box. No external clips or attachment points extend from the box, and thus the box can be more readily shipped and stored.

Figure 7:
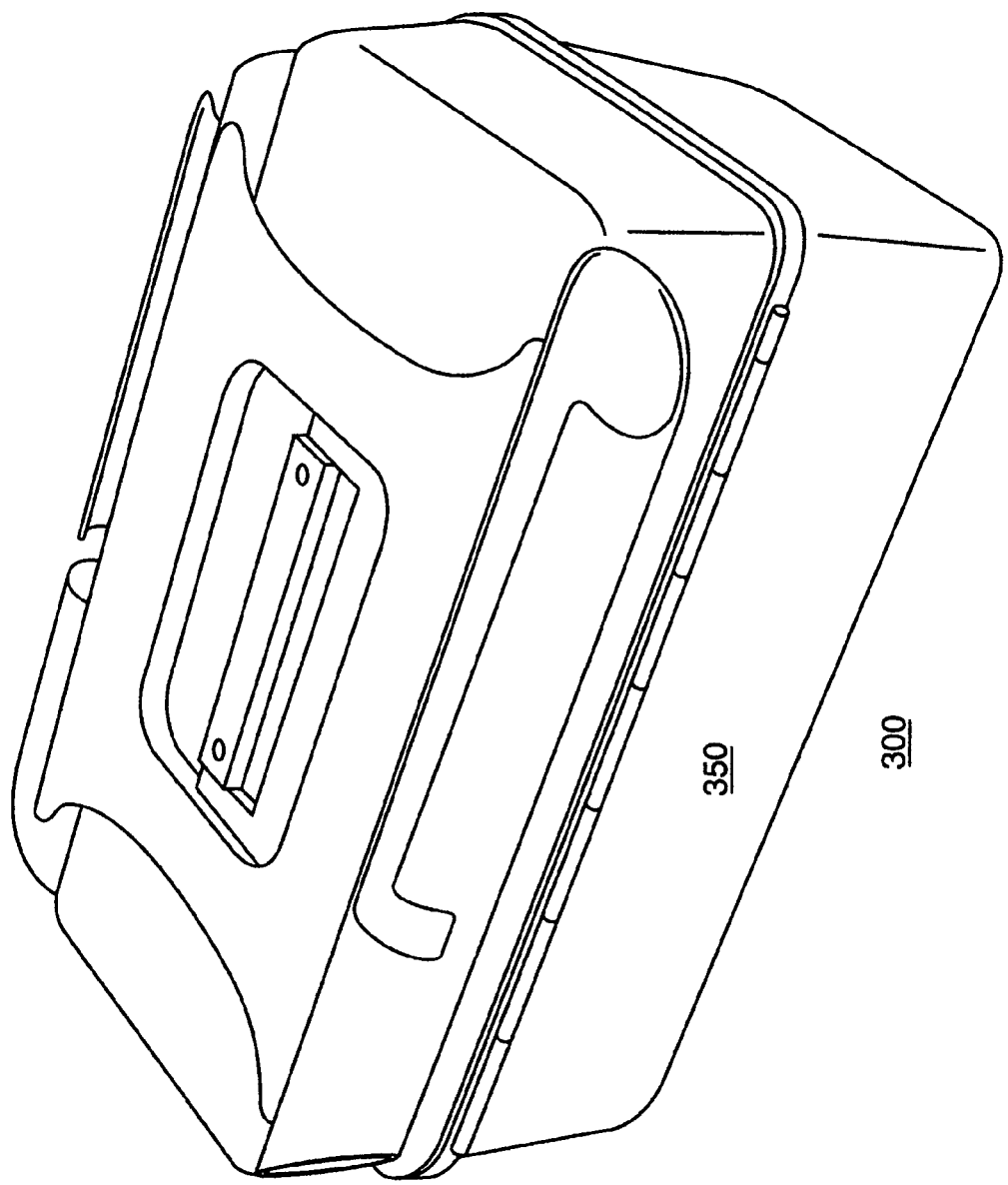
FIG. 7 illustrates a perspective view of the third embodiment of the present invention.
Figure 8:
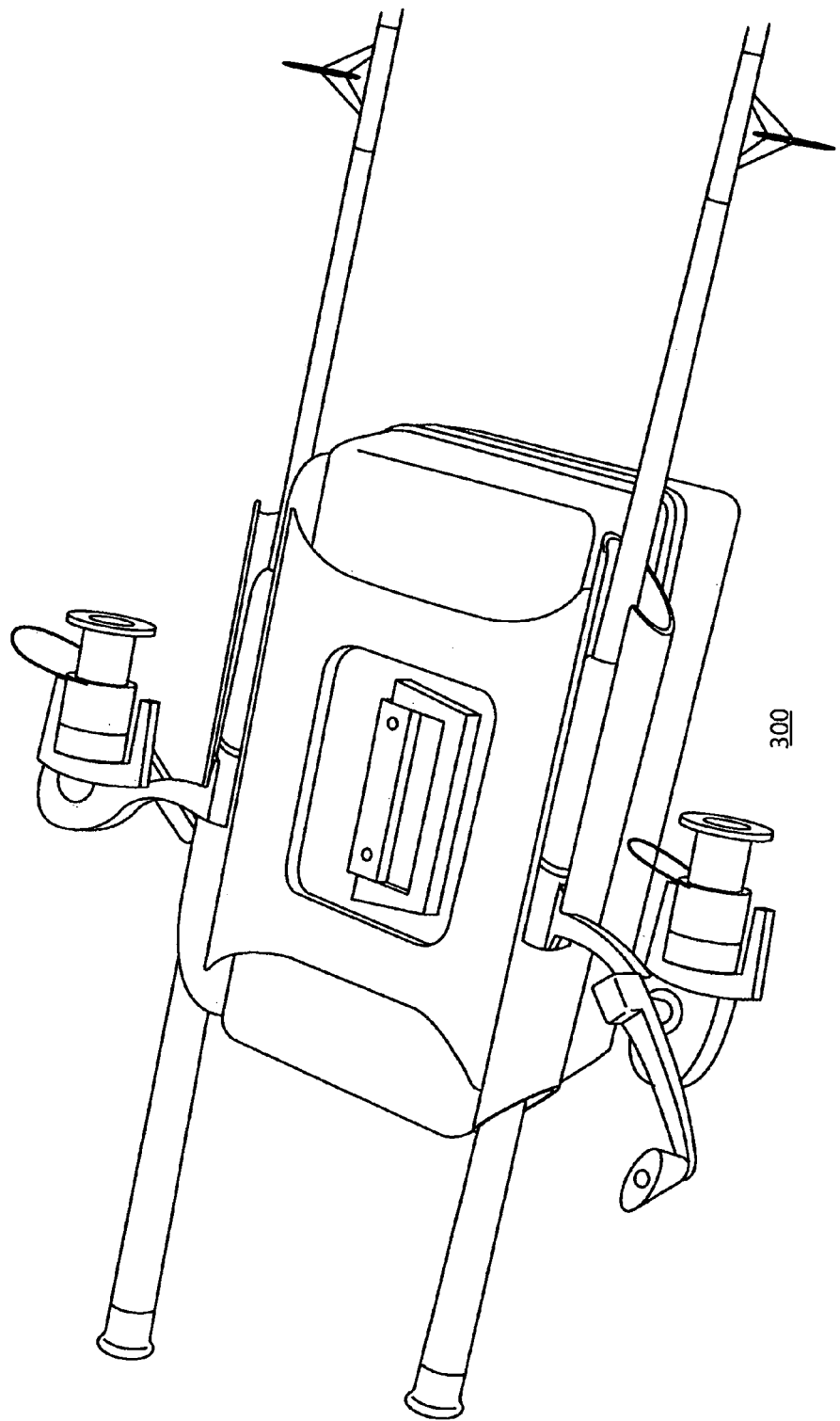
FIG. 8 illustrates a perspective view of the third embodiment of the present invention, illustrating rods inserted into the device.
Figure 17:
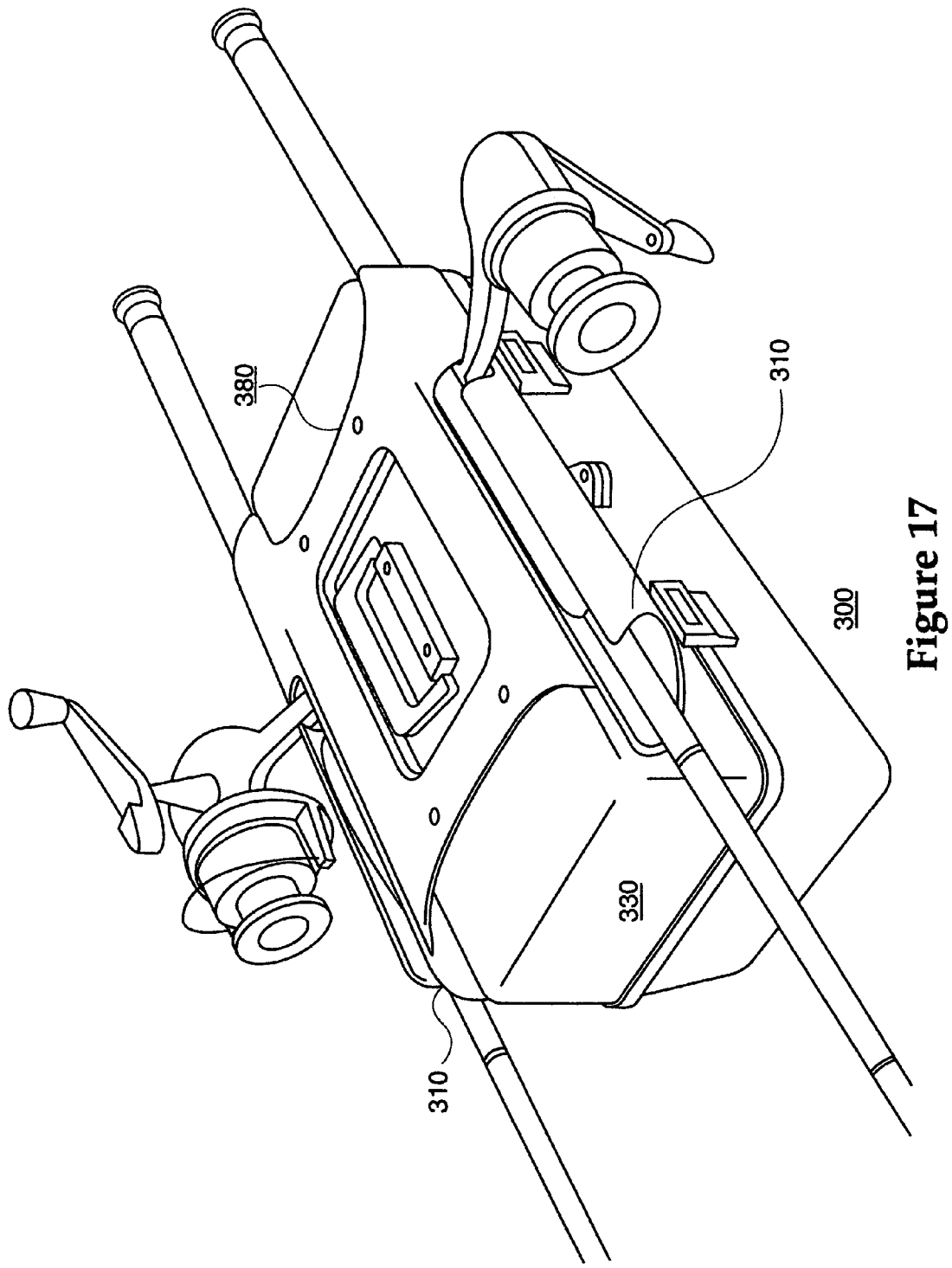
FIG. 17 illustrates a perspective view of the third embodiment of the present invention, as mounted to a tackle box and with fishing poles inserted into the device.
Figure 18:
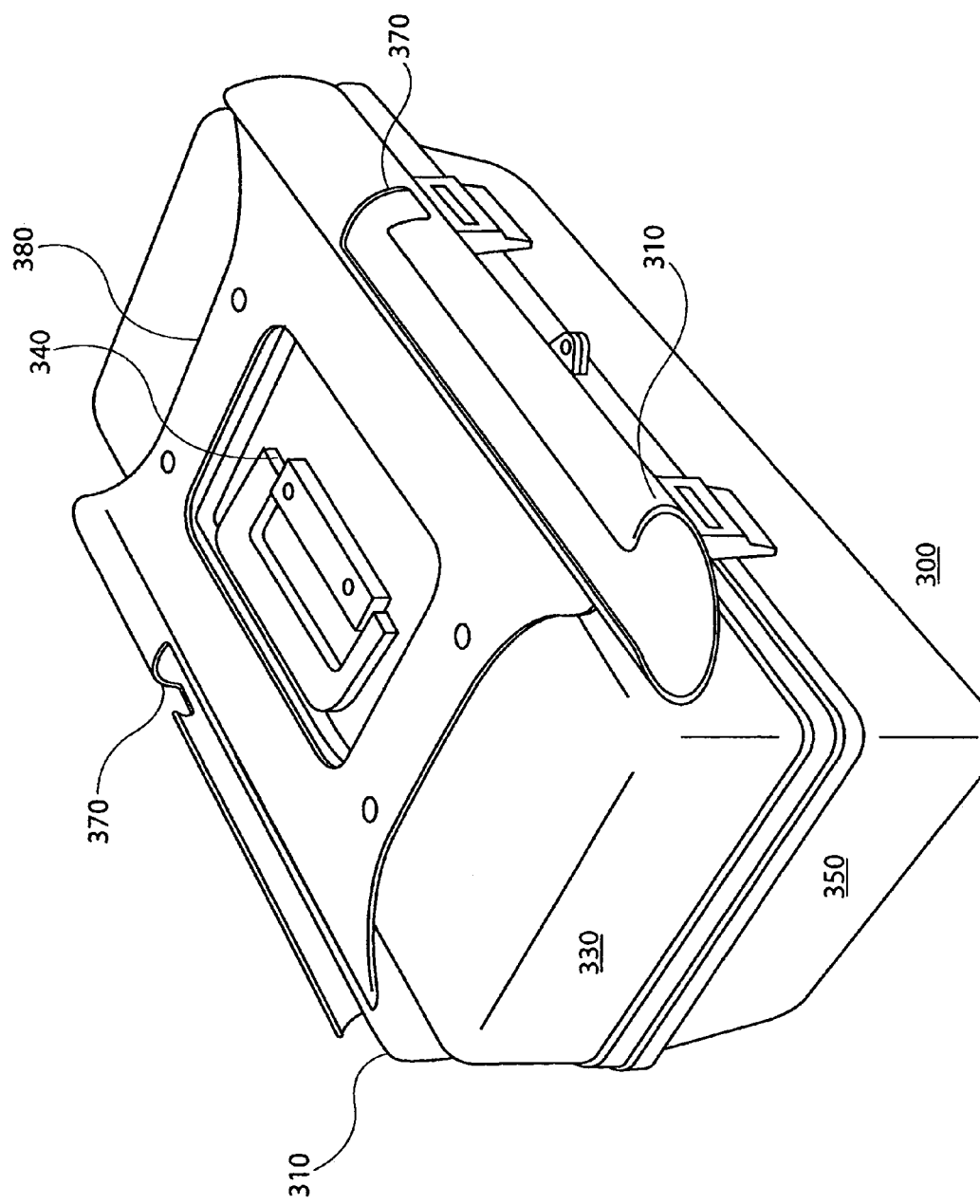
FIG. 18 illustrates a perspective view of the third embodiment of the present invention, as mounted to a tackle box.
Figure 27:
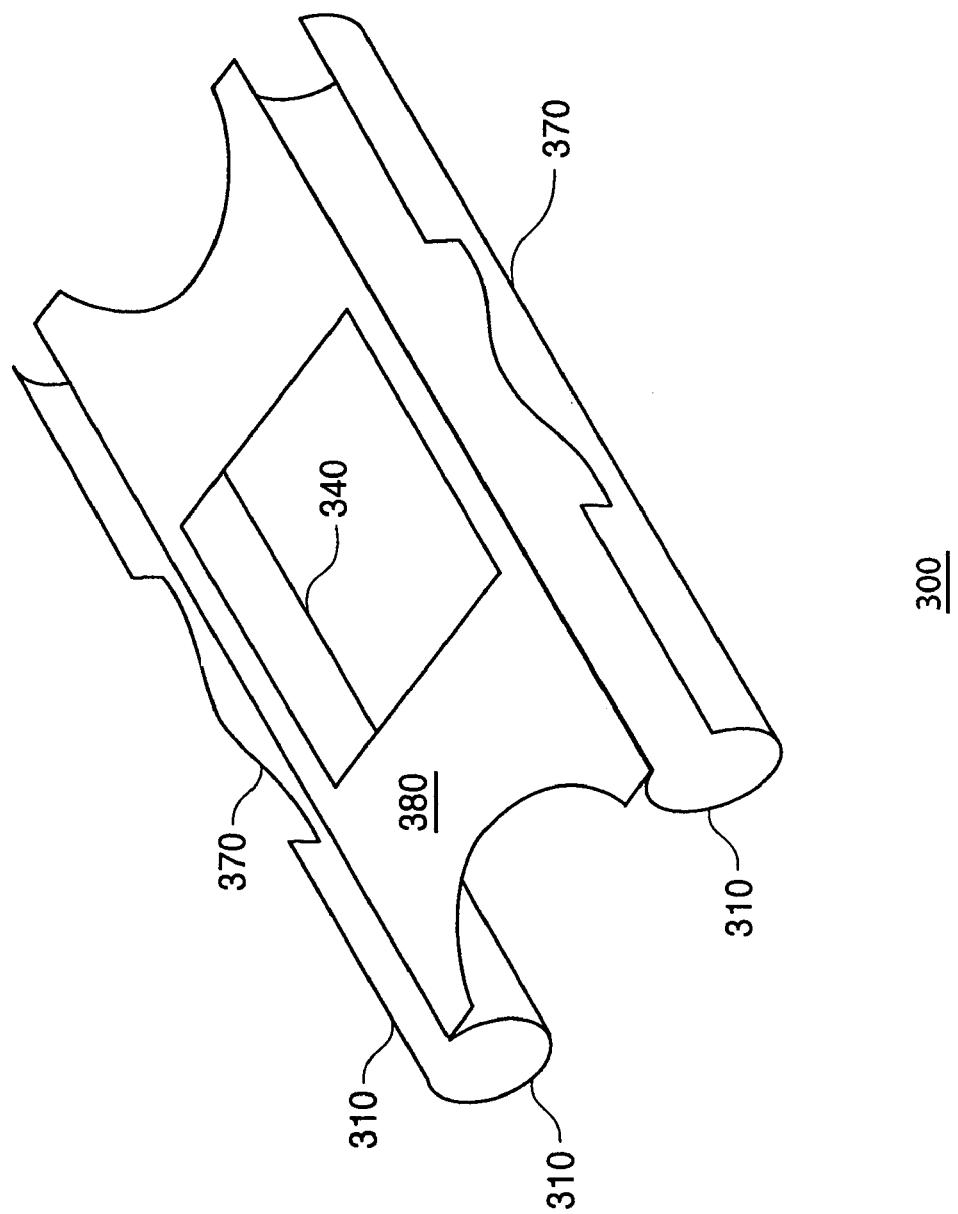
FIG. 27 is a drawing illustrating a perspective view of the lid of the third embodiment of the present invention.
Figure 28:
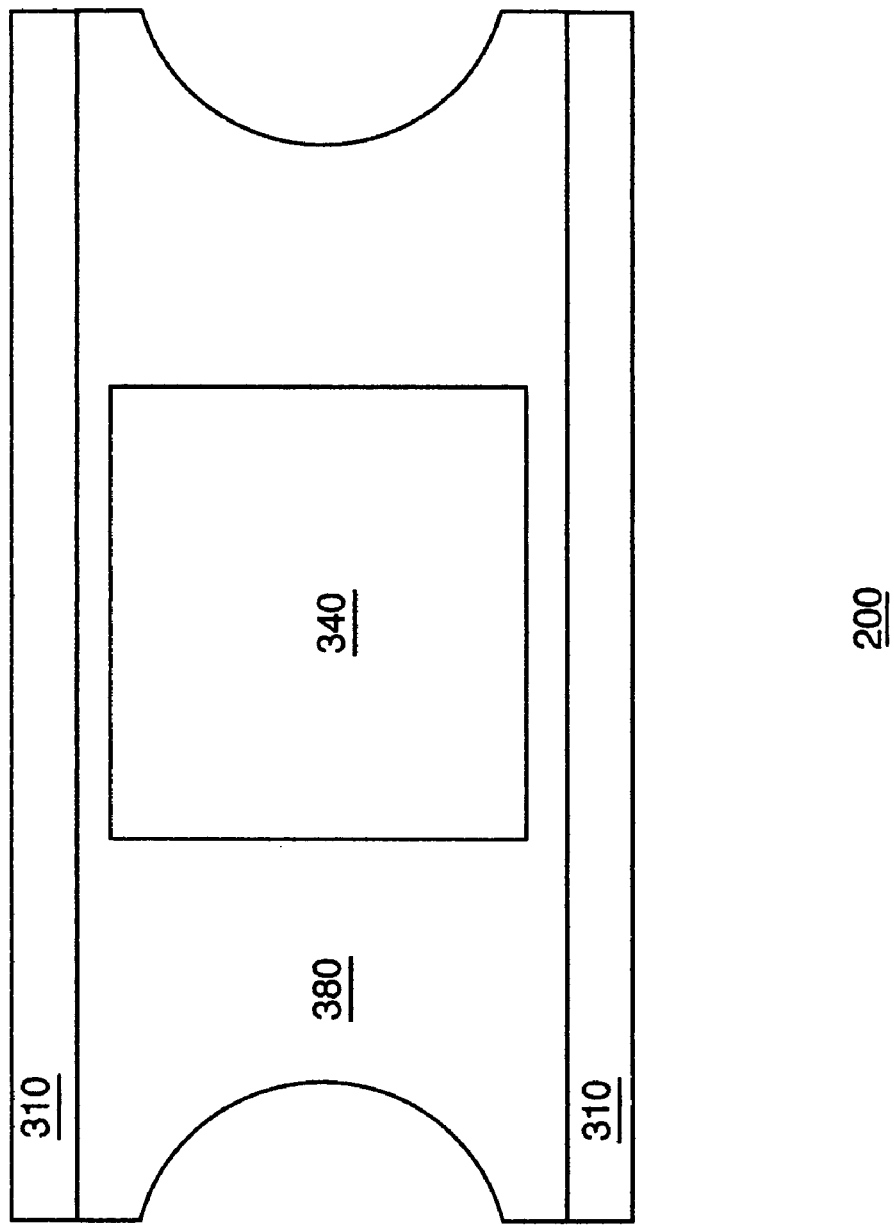
FIG. 28 is a drawing illustrating a top view of the third embodiment of the present invention.
Figure 29:
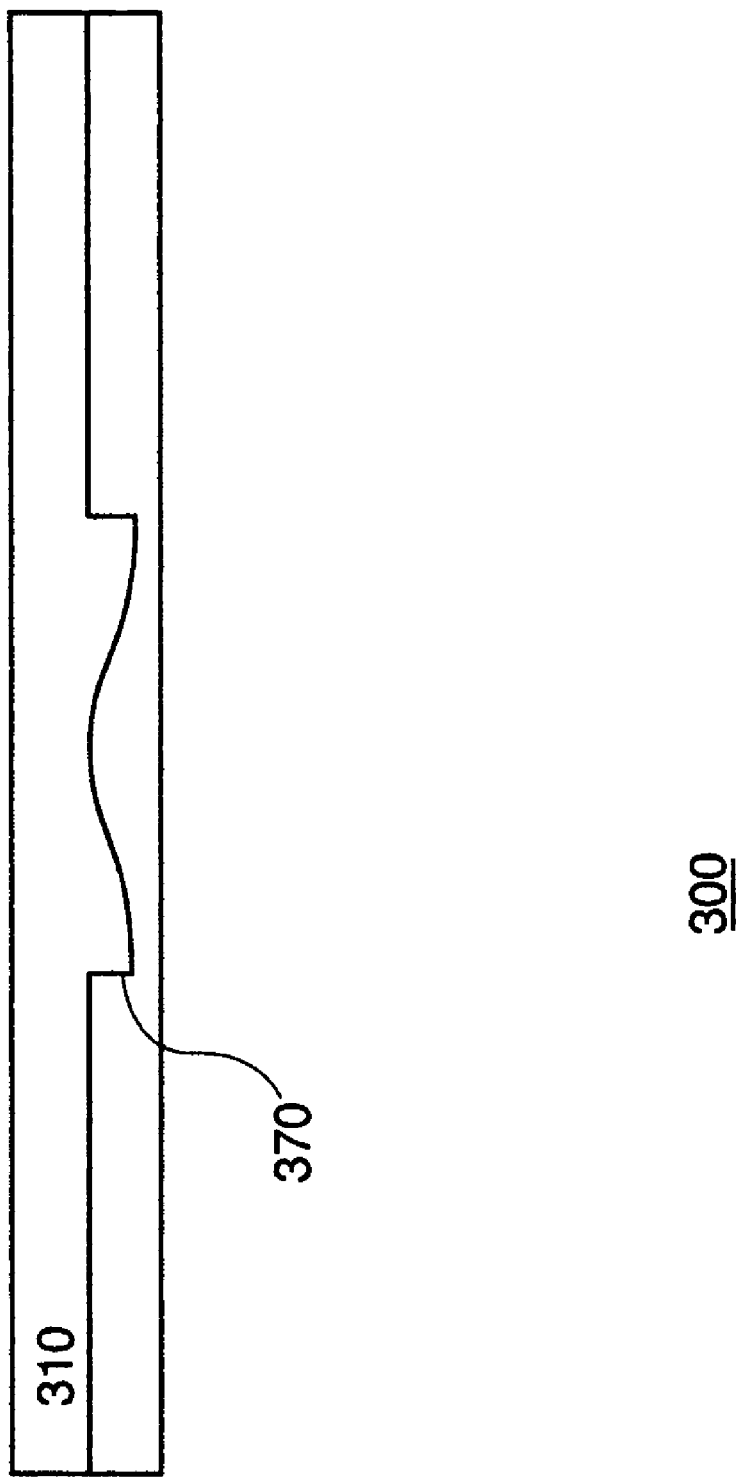
FIG. 29 is a drawing illustrating a front view of the third embodiment of the present invention.
Figure 30:
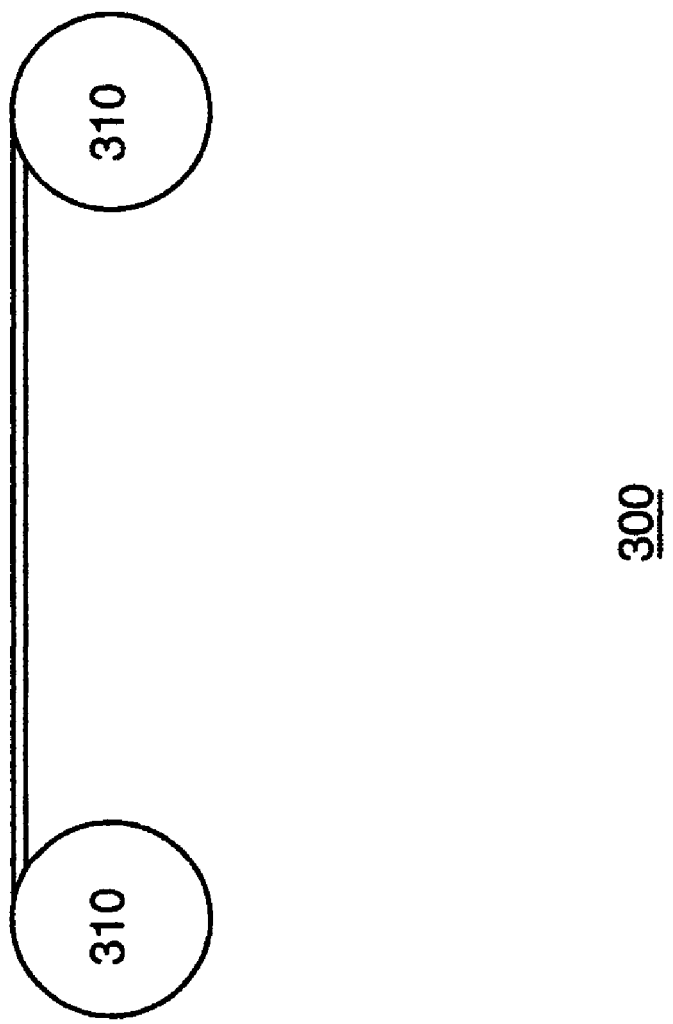
FIG. 30 is a drawing illustrating a side view of the third embodiment of the present invention.

FIG. 7 illustrates a perspective view of the third embodiment of the present invention. FIG. 8 illustrates a perspective view of the third embodiment of the present invention, illustrating rods inserted into the device. FIG. 17 illustrates a perspective view of the third embodiment of the present invention, as mounted to a tackle box and with fishing poles inserted into the device. FIG. 18 illustrates a perspective view of the third embodiment of the present invention, as mounted to a tackle box. FIG. 27 is a drawing illustrating a perspective view of the lid of the third embodiment of the present invention. FIG. 28 is a drawing illustrating a top view of the third embodiment of the present invention. FIG. 29 is a drawing illustrating a front view of the third embodiment of the present invention. FIG. 30 is a drawing illustrating a side view of the third embodiment of the present invention.

Referring to FIGS. 7, 8, 17, 18, and 27-30, the third embodiment of the present invention will now be described. In this third embodiment, a tackle box 300 may be provided with a box portion 350 and a lid portion 330 which may be hinged or the like as is known in the art. A clasp or other fastening means (not shown) may hold lid portion 330 to box portion 350. A centrally located handle 340 may be used to carry the box 300.

Attached to lid 330 via planar portion 380, may be one or more tubular portions 310, which in this embodiment may comprise closed and partially open tubular portions having a circular and semicircular cross-section similar to the second embodiment of the present invention. Cutouts 370 may be provided in these tubular portions 310 to allow the reel support to rest when a fishing pole is placed in tubular portion 310 as is illustrated in FIGS. 8 and 17.

In this embodiment, the handle portion of the rod may be inserted into the tube 310 and the rod support locked into slot 370. This embodiment provides a much more secure grip for the rod than the first embodiment. Other items such as a flashlight may be inserted into the tubular portion 310.

This embodiment can be offered as an after-market accessory which an end-user (e.g., fisherman) can attach to an existing tackle box via screws or other fasteners, double-sided tape, adhesive, or the like. Alternately, this embodiment may allow a tackle box manufacturer to upgrade an existing line of tackle boxes without having to re-tool the box lids or other portions of the box. The apparatus of the third embodiment of the present invention also can provide the advantages of the first and second embodiments without reducing the interior volume of the tackle box.

Figure 31:
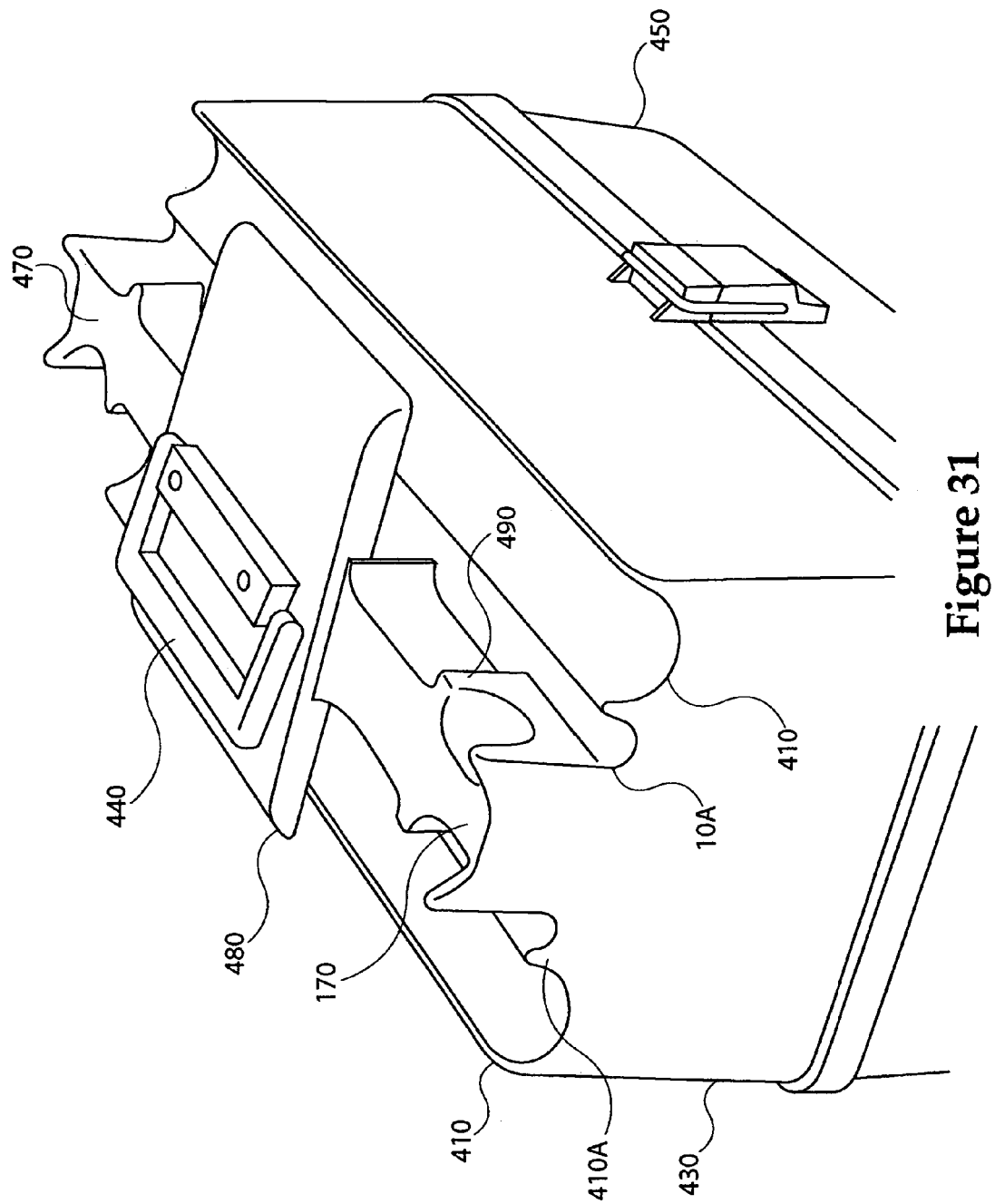
FIG. 31 illustrates a perspective view of a fourth embodiment of the present invention.
Figure 32:
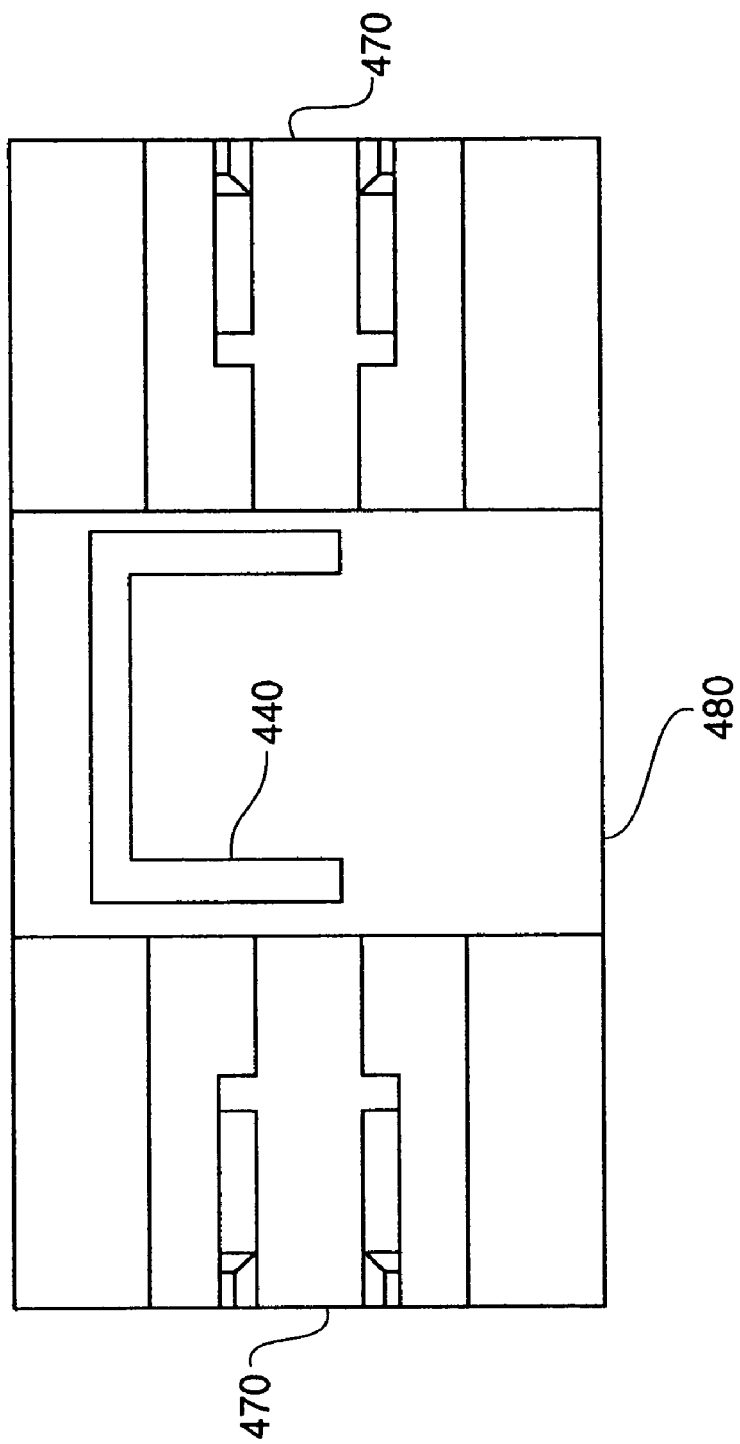
FIG. 32 is a drawing illustrating a top view of the fourth embodiment of the present invention.
Figure 33:
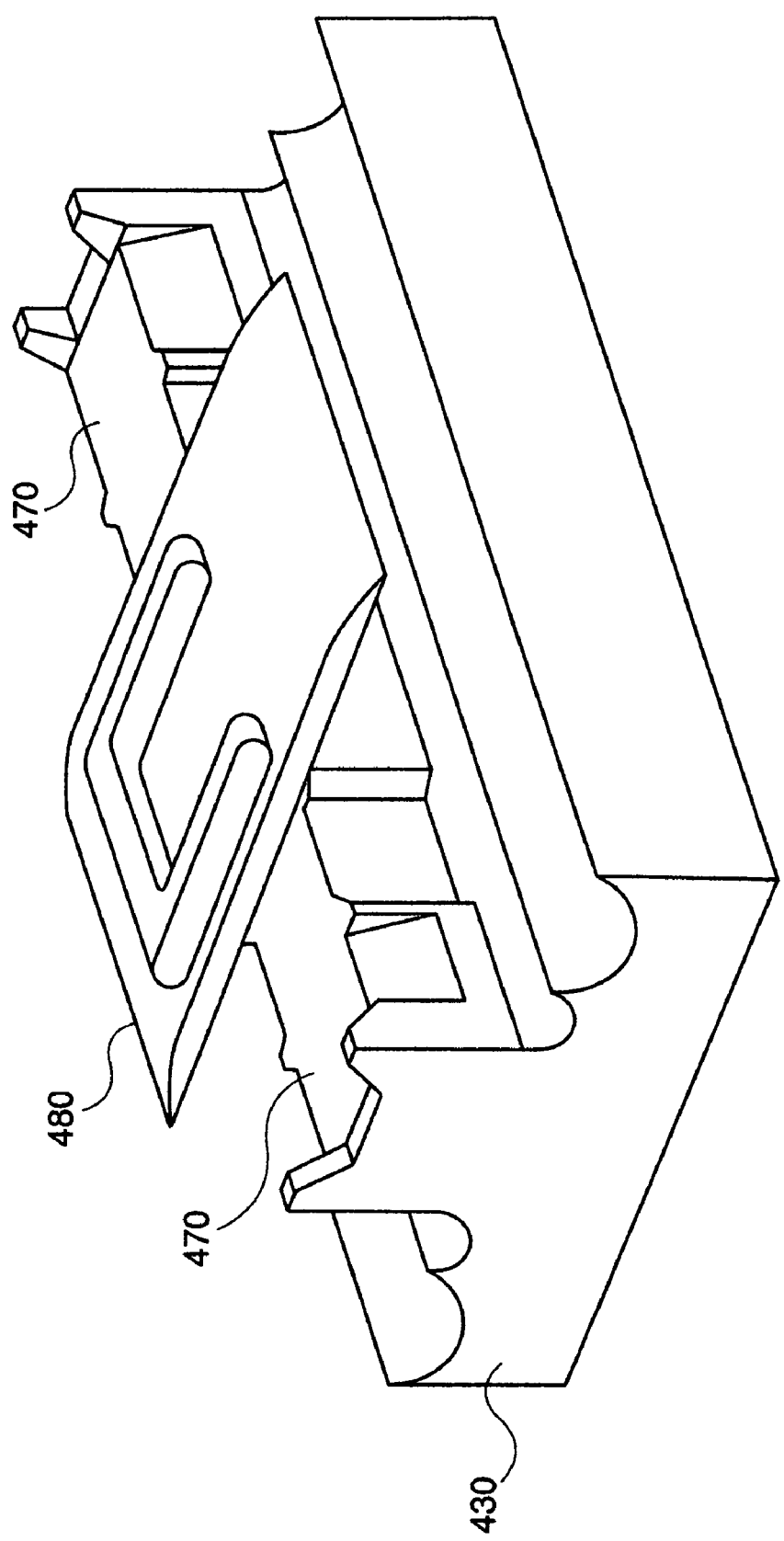
FIG. 33 is a drawing illustrating a perspective view of the fourth embodiment of the present invention.
Figure 34:
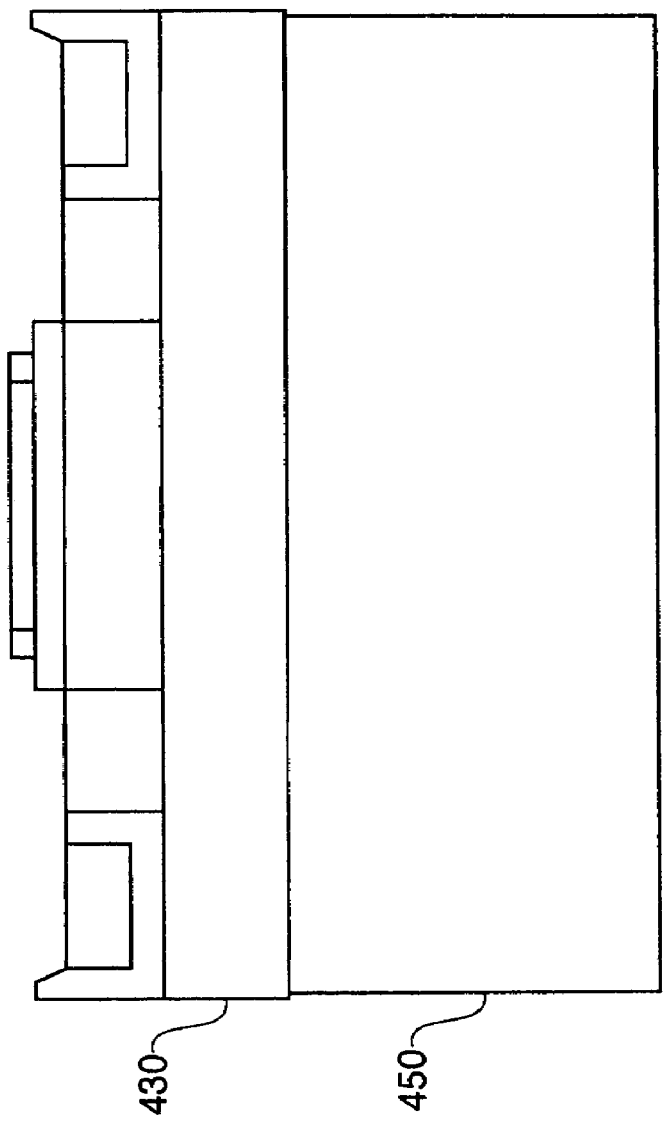
FIG. 34 is a drawing illustrating a side view of the fourth embodiment of the present invention.
Figure 35:
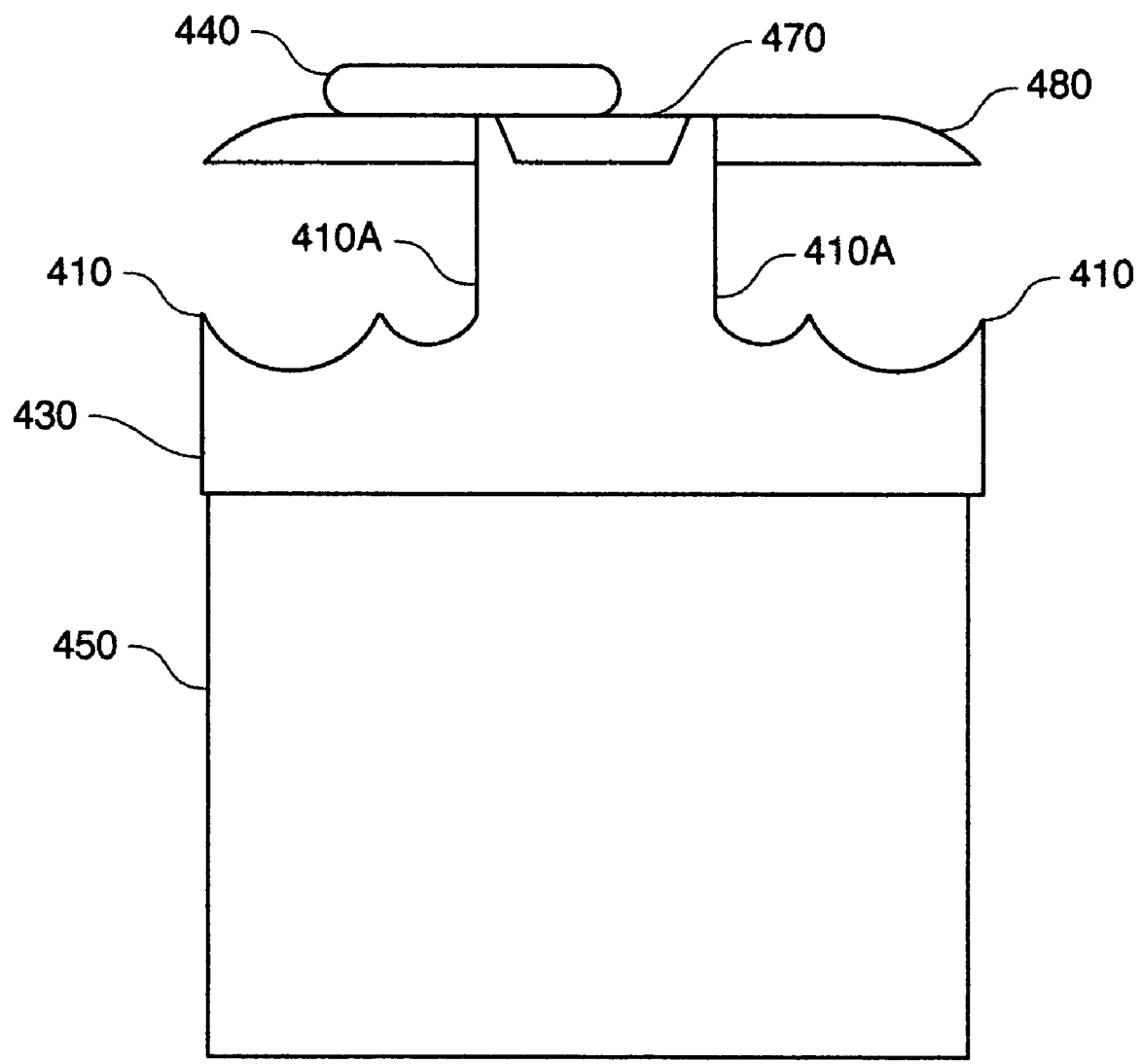
FIG. 35 is a drawing illustrating an end view of the fourth embodiment of the present invention.
Figure 36:
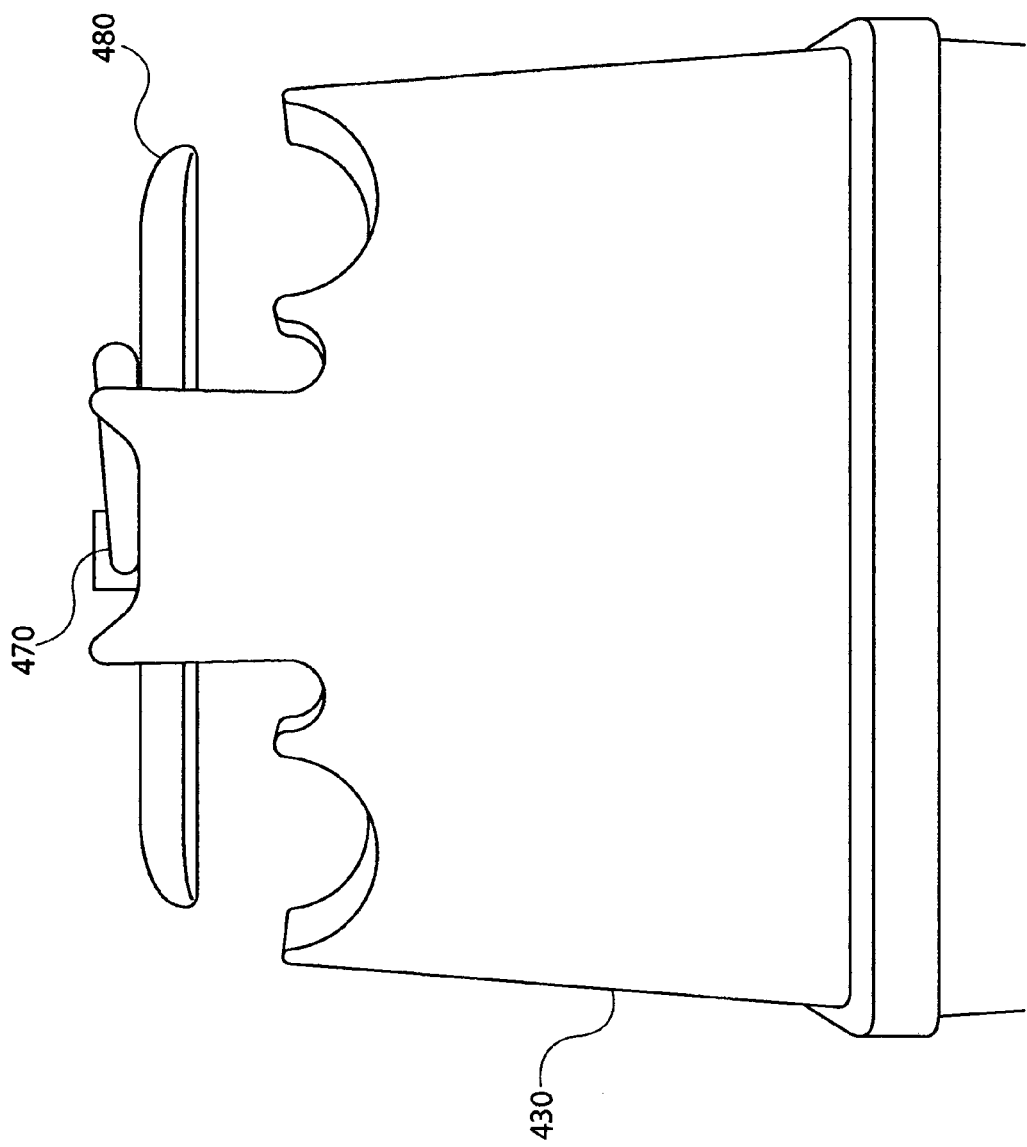
FIG. 36 illustrates an end view of the fourth embodiment of the present invention.
Figure 37:
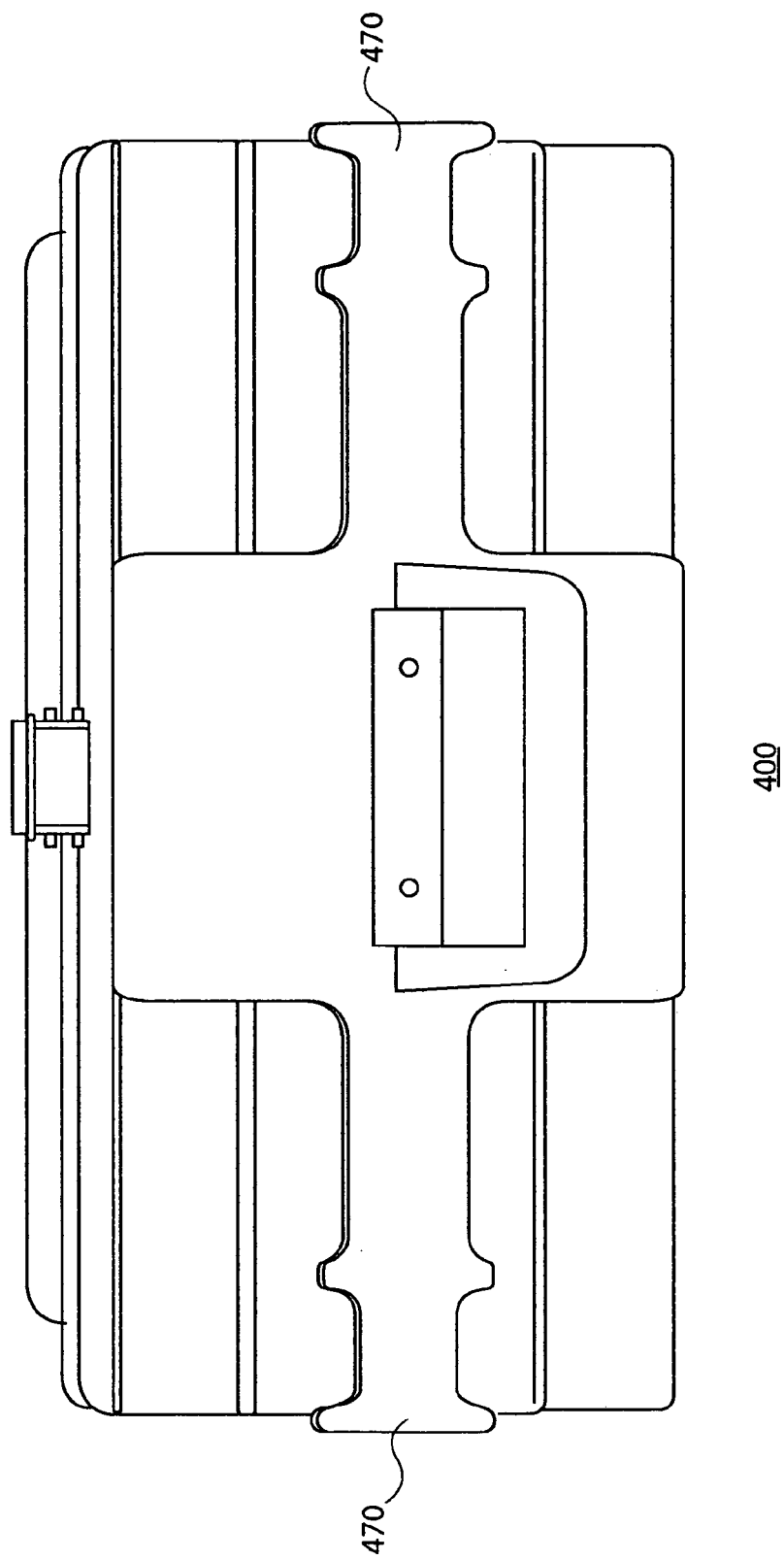
FIG. 37 illustrates a top view of the fourth embodiment of the present invention.

FIG. 31 illustrates a perspective view of a fourth embodiment of the present invention. FIG. 32 is a drawing illustrating a top view of the fourth embodiment of the present invention. FIG. 33 is a drawing illustrating a perspective view of the fourth embodiment of the present invention. FIG. 34 is a drawing illustrating a side view of the fourth embodiment of the present invention. FIG. 35 is a drawing illustrating an end view of the fourth embodiment of the present invention. FIG. 36 illustrates an end view of the fourth embodiment of the present invention. FIG. 37 illustrates a top view of the fourth embodiment of the present invention.

Referring to FIGS. 31-37, the basic elements of this fourth embodiment of the present invention are now described. In this fourth embodiment, a tackle box 400 may be provided with a box portion 450 and a lid portion 430 which may be hinged or the like as is known in the art. A clasp 460 or other fastening means may hold lid portion 430 to box portion 450. A centrally located handle 440 may be used to carry the box 400.

Molded into lid 430 may be one or more tubular portions 410 which in this embodiment may comprise open tubular portions having a semicircular cross-section. Cutouts 470 may be provided in these tubular portions 410 to allow the reel support to rest when a fishing pole is placed in tubular portion 410.

In addition, the embodiment of FIGS. 31-37 may also be provided with rod holders 410A to hold a rod portion, for example, in an instance where a multi-piece rod is used. As illustrated in FIGS. 38-42, this second rod portion may rest within rod holders 410A so that the entire rod and tackle box assembly forms a compact package. Additional rod holders 410A may be provided for rods comprising additional sections (e.g., 3 or more). Moreover, although illustrated only in connection with the fourth embodiment of the present invention, it should be understood that the rod holders 410A of this fourth embodiment may be provided in all four embodiments of the present invention as disclosed herein.

Figure 38:
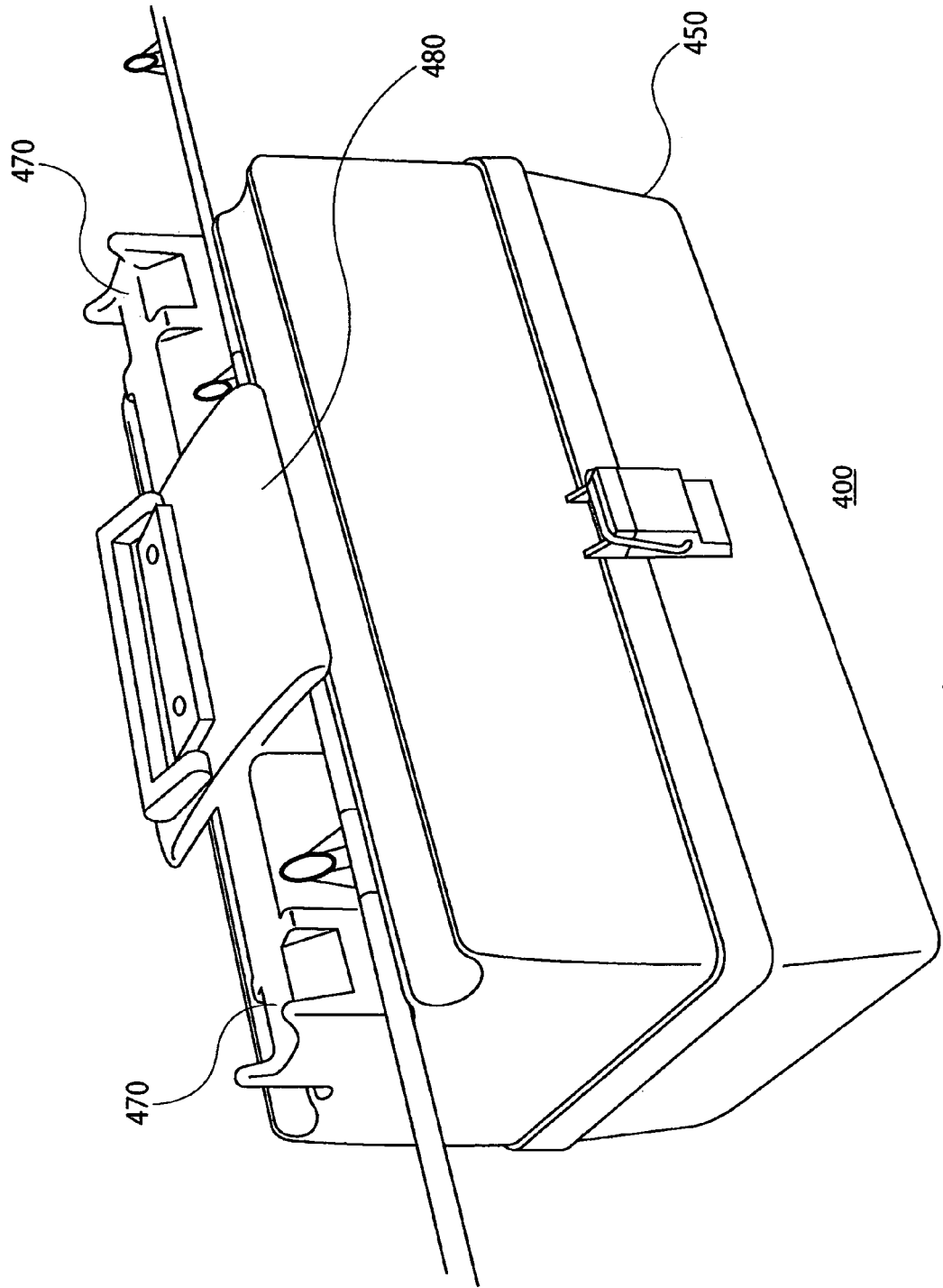
FIG. 38 illustrates a perspective view of the fourth embodiment of the present invention, with a fishing rod inserted into the lid of the tackle box.
Figure 39:
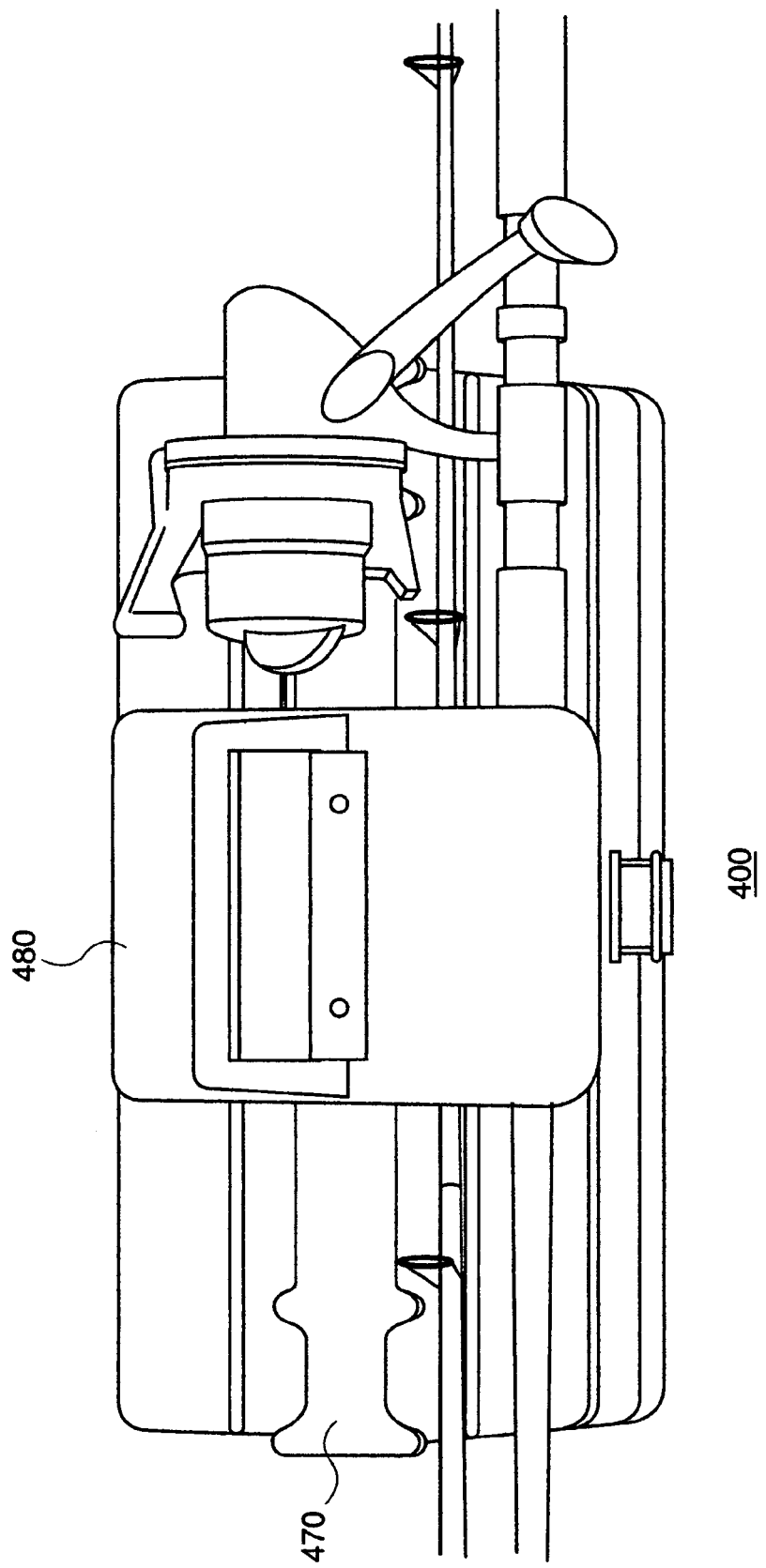
FIG. 39 illustrates a top view of the fourth embodiment of the present invention, illustrating a fishing rod inserted into the lid of the tackle box, with the reel rested in the lid.
Figure 40:
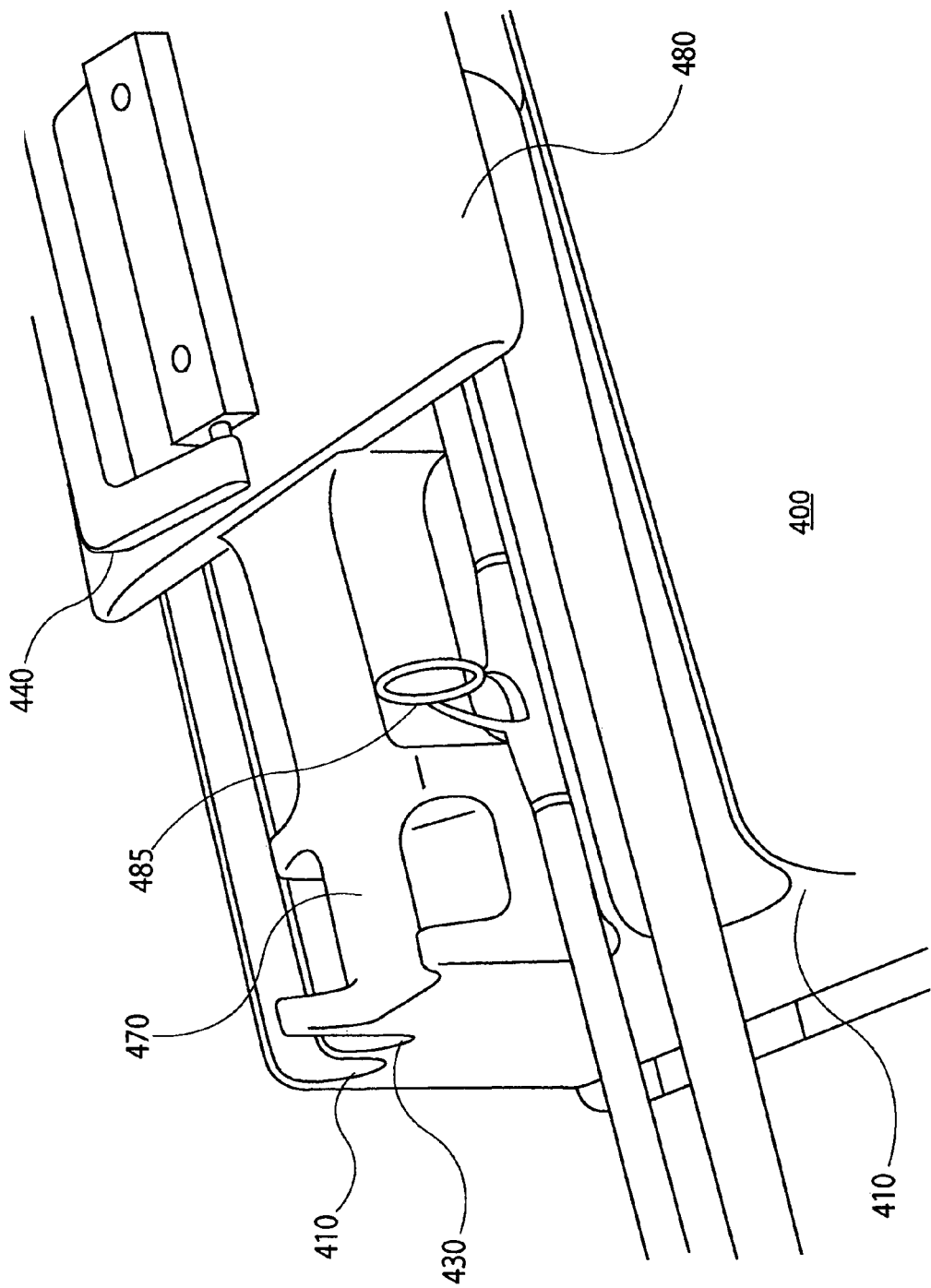
FIG. 40 illustrates a perspective view of the fourth embodiment of the present invention, illustrating how the line guides in the fishing pole are fitted into corresponding indents in the tackle box lid.
Figure 41:
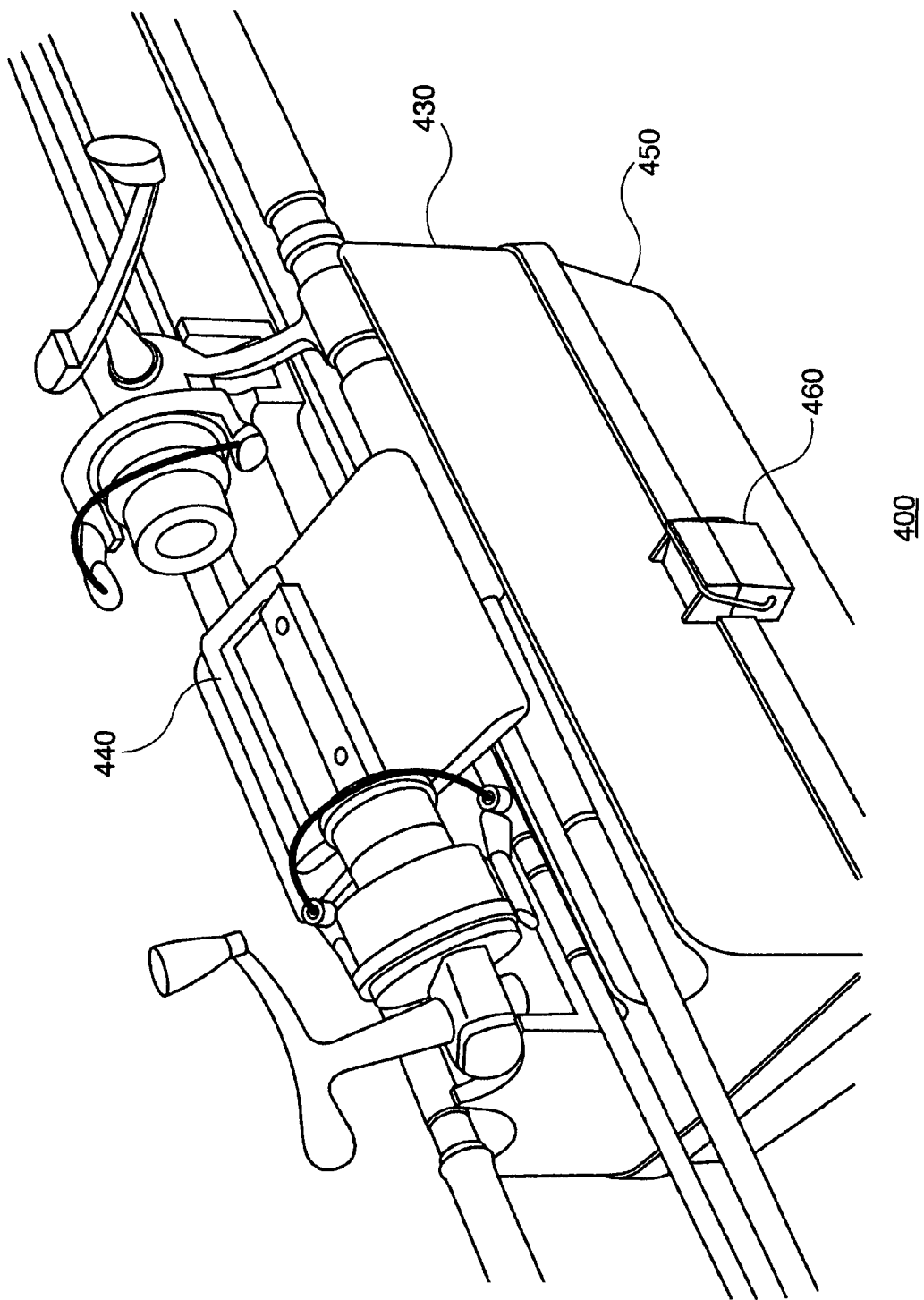
FIG. 41 illustrates a perspective view of the fourth embodiment of the present invention, illustrating how two fishing rods may be accepted into the tackle box lid.
Figure 42:
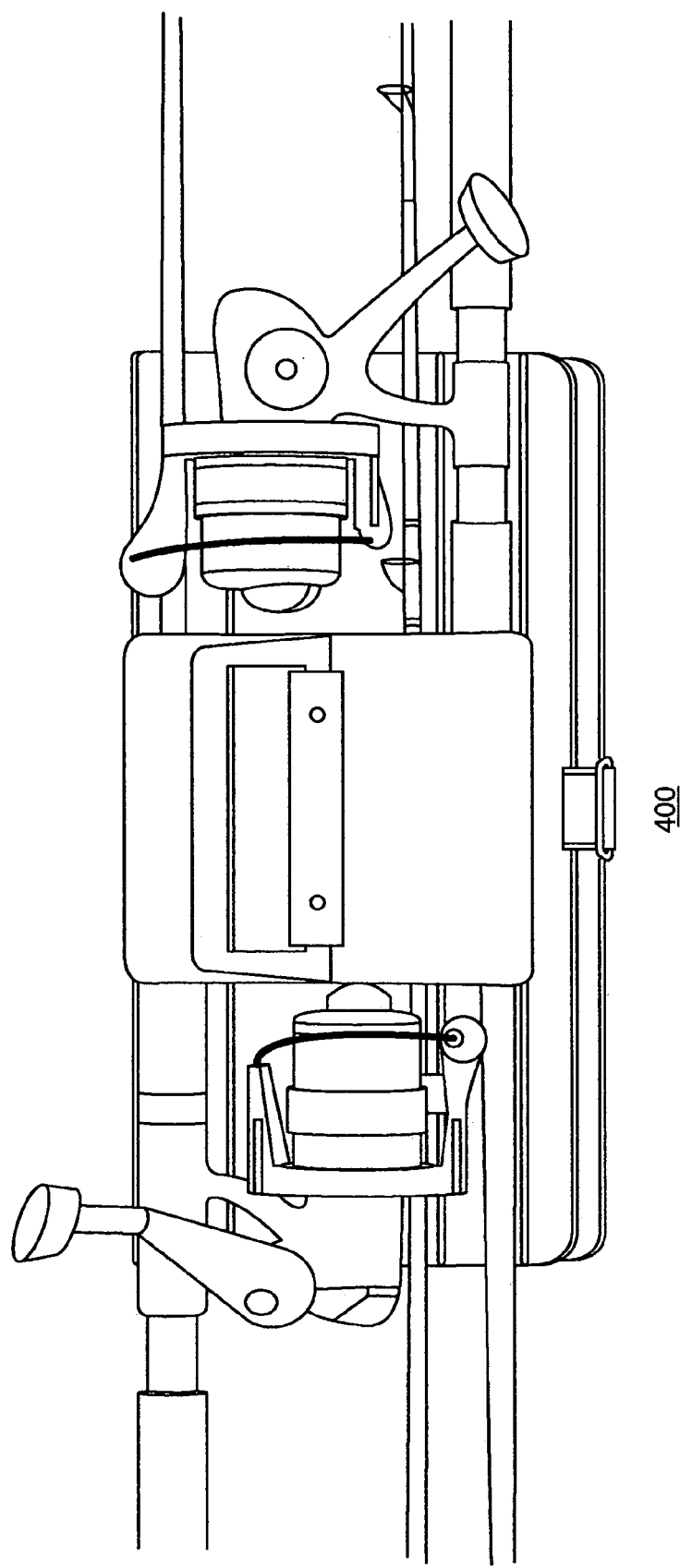
FIG. 42 illustrates a top view of the fourth embodiment of the present invention, illustrating how two fishing rods may be accepted into the tackle box lid.

FIG. 38 illustrates a perspective view of the fourth embodiment of the present invention, with a fishing rod inserted into the lid of the tackle box. FIG. 39 illustrates a top view of the fourth embodiment of the present invention, illustrating a fishing rod inserted into the lid of the tackle box, with the reel rested in the lid. FIG. 40 illustrates a perspective view of the fourth embodiment of the present invention, illustrating how the line guides in the fishing pole are fitted into corrresponding indents 490 in the tackle box lid. FIG. 41 illustrates a perspective view of the fourth embodiment of the present invention, illustrating how two fishing rods may be accepted into the tackle box lid. FIG. 42 illustrates a top view of the fourth embodiment of the present invention, illustrating how two fishing rods may be accepted into the tackle box lid.

Referring to all of FIGS. 31-42, additional features of this fourth embodiment of the present invention are now presented. This fourth embodiment of FIGS. 31-42 allows for two fishing rods to be stored securely in the lid 430 of a fishing tackle box, such that the entire assembly of fishing tackle box and fishing rods can be carried with one hand, freeing the other hand for carrying other gear and/or steadying the user when, for example, boarding a boat. This invention also allows fishing poles to be stored in the box lid, preventing them from becoming separated from other fishing gear, from falling off the dock, or the like. In this embodiment, provision is made for storing sections of a multi-piece rod, and a cutout 470 is provided to allow the reel to securely rest on the lid.

In addition, a flat portion 480 is provided near handle 440, so that handle 440 will rest flat when not in use. This flat portion extends over the fishing rod holding portion to help further secure the fishing rods. In the prior embodiments, tube-like portions were formed in the lid of the tackle box to secure fishing rods. While these tube like portions work well, they can be more expensive to manufacture than a traditional tackle box lid having a plain surface: The use of the concave surfaces makes injection molding more complex. The flat surface 480 of this fourth embodiment may be separately molded, or cut from a stock material (e.g., marine board, which also makes an excellent fish cleaning surface) and then attached to lid 430 using the same fasteners (screws, bolts, rivets, or the like) as is used to secure handle 440. Thus, while providing an additional assembly part 480, the use of the same fasteners as handle 440 means there is no additional assembly step. Note that other means of attachment may be used, including but not limited to adhesives, ultrasonic welding, melting together of plastics by heat, epoxies, or the like.

This embodiment may also provide a notched portion 485, to fit the line guides of a rod portion when inserted into U-shaped channel 410A. These notched portions allow the rod section to lay flat in channel 410A and also act to help secure the rod portion by reducing the tendency to slide back and forth in channel 410A.

While the preferred embodiment and various alternative embodiments of the invention have been disclosed and described in detail herein, it may be apparent to those skilled in the art that various changes in form and detail may be made therein without departing from the spirit and scope thereof.

For example, while the primary embodiments disclosed herein show the fishing rods being held to the lid of the box (or rod portions attached to the side), the present invention may be suitably modified to allow the rod or rod portions to be stored or attached to other portions of the tackle box, for example, the base of the tackle box, for better center of gravity or to allow the lid to be opened without having to remove the rods. In addition, the present invention may be applied to other arts as well, to store other devices other than fishing rods. Any elongated device may be inserted into the openings provided in a utility box or the like for carrying or storage, without departing from the spirit and scope of the present invention.

I claim:

1. A tackle box for carrying fishing poles, comprising:
a box portion for accepting fishing tackle;
a lid portion hinged to the box portion; and
at least a partial tube portion coupled to the tackle box, for loosely engaging a pole portion of a fishing pole parallel to the lid portion,
wherein the at least partial tube portion includes a cutout in the at least a partial tube portion to secure a reel portion of a fishing pole to one side of lid portion, said cutout including a notch for securably engaging a stem of the reel portion of the fishing pole so as to prevent the fishing pole from sliding out of the at least partial tube portion.

2. The tackle box of claim 1, wherein the at least a partial tube portion is built into the box portion.

3. The tackle box of claim 1, further comprising at least one rod clip, for holding a disassembled upper portion of a fishing pole where the fishing pole is a multi-piece rod.

4. The tackle box of claim 1, wherein a slot is cut into the at least a partial tube portion to allow a shaft of a fishing reel to slide into the at least partial tube portion with a fishing pole.

5. The tackle box of claim 4, wherein a shape is formed from the slot in the at least a partial tube portion to allow a reel shaft to be twisted slightly, therefore being locked into the at least a partial tube portion, thus preventing a rod and reel from sliding out of the at least a partial tube portion.

6. The tackle box of claim 1, wherein the at least a partial tube portion is attached to any part of the tackle box.

7. The tackle box of claim 6, wherein the at least a partial tube portion is incorporated as handle for the tackle box.

8. The tackle box of claim 1, wherein the at least a partial tube portion is formed of a tube having a portion of the tube removed to form holes or slots for securing a reel portion of a fishing rod.

9. The tackle box of claim 1, further comprising at least one V hook attached to the side of the tackle box for supporting a portion of a fishing pole.

10. The tackle box of claim 1, further comprising:
a lid portion hinged to the box portion; and
an upper portion attached to the lid portion, for covering at least a portion of the at least a partial tube portion, so as to at least partially secure fishing rods in the at least a partial tube portion.

11. The tackle box of claim 10, further comprising a carrying handle attached to the lid portion through the upper portion.

12. A utility box comprising:
a box portion for storing items;
a lid portion hingably attached to the box portion;
at least a partial tube portion. coupled to the box portion, for loosely engaging a portion of an elongated object parallel to the lid portion, and
clips for holding an additional elongated object
wherein the at least a partial tube portion includes a cutout in the at least a partial tube portion to secure a protruding portion of the elongated object to on side of lid portion.

13. A utility box comprising:
a box portion for storing items;
a lid portion hingably attached to the box portion; and
at least a partial tube portion, coupled to the box portion, for loosely engaging a portion of an elongated object parallel to the lid portion.

wherein the at least a partial tube portion includes a cutout in the at least a partial tube portion to secure a protruding portion of the elongated object to on side of lid portion,
wherein the lid portion has the at least a partial tube portion formed therein, and
wherein the at least a partial tube portion is mounted internally to the lid portion, with holes extending through at least one end of the utility box.

14. A utility box comprising;
a box portion for storing items;
a lid portion hingably attached to the box portion; and
at least a partial tube portion, coupled to the box portion, for loosely engaging a portion of an elongated object parallel to the lid portion,
wherein the at least a partial tube portion includes a cutout in the at least a partial tube portion to secure a protruding portion of the elongated object to on side of lid portion, and
wherein a slot is cut into the at least a partial tube portion to allow a portion of the elongated object to slide into the at least a partial tube portion.

15. The utility box of claim 14, wherein a shape is formed from the slot in the at least a partial tube portion to allow a protruding portion of the elongated object to be twisted slightly, therefore being locked into the at least a partial tube portion, thus preventing the elongated object from sliding out of the at least a partial tube portion.

16. A utility box comprising:
a box portion for storing items;
a lid portion hingably attached to the box portion;
at least a partial tube portion, coupled to the box portion, for loosely engaging a portion of an elongated object parallel to the lid portion, and
at least one V hook attached to the side of the utility box for supporting a portion of an elongated object,
wherein the at least a partial tube portion includes a cutout in the at least a partial tube portion to secure a protruding portion of the elongated object to on side of lid portion.

* * * * *